United States Patent
Perkins et al.

(10) Patent No.: US 12,413,175 B2
(45) Date of Patent: Sep. 9, 2025

(54) SOLAR ROOFING SYSTEM

(71) Applicant: GAF Energy LLC, Parsippany, NJ (US)

(72) Inventors: Richard Perkins, San Jose, CA (US); Matthew Peterson Grigsby, San Francisco, CA (US)

(73) Assignee: GAF Energy LLC, Parsippany, NJ (US)

( * ) Notice: Subject to any disclaimer, the term of this patent is extended or adjusted under 35 U.S.C. 154(b) by 314 days.

(21) Appl. No.: 18/066,817

(22) Filed: Dec. 15, 2022

(65) Prior Publication Data

US 2023/0155537 A1     May 18, 2023

Related U.S. Application Data

(63) Continuation of application No. 17/499,516, filed on Oct. 12, 2021, now Pat. No. 11,545,928.
(Continued)

(51) Int. Cl.
*E04D 1/20* (2006.01)
*E04D 1/26* (2006.01)
(Continued)

(52) U.S. Cl.
CPC ............... *H02S 20/25* (2014.12); *E04D 1/20* (2013.01); *E04D 1/265* (2013.01); *E04D 1/30* (2013.01);
(Continued)

(58) Field of Classification Search
CPC ......... Y02B 10/10; Y02E 10/50; H02S 20/25; H02S 20/23; E04D 1/26; E04D 1/12
See application file for complete search history.

(56) References Cited

U.S. PATENT DOCUMENTS

| | | |
|---|---|---|
| 1,981,467 A | 11/1934 | Radtke |
| 3,156,497 A | 11/1964 | Lessard |

(Continued)

FOREIGN PATENT DOCUMENTS

| | | |
|---|---|---|
| CA | 2829440 A | 5/2019 |
| CH | 700095 A2 | 6/2010 |

(Continued)

OTHER PUBLICATIONS

Sunflare, Procducts: "Sunflare Develops Prototype For New Residential Solar Shingles"; 2019 <<sunflaresolar.com/news/sunflare-develops-prototype-for-new-residential-solar-shingles>> retrieved Feb. 2, 2021.

(Continued)

*Primary Examiner* — Brian E Glessner
*Assistant Examiner* — Daniel J Kenny
(74) *Attorney, Agent, or Firm* — GREENBERG TRAURIG, LLP

(57) ABSTRACT

A system includes a photovoltaic module having photovoltaic cells, each having a width, and a roofing shingle having an exposure zone and a headlap zone. A plurality of slots extends from the exposure zone to the headlap zone and define tooth portions. A first one of the tooth portions has a first side defined by a first slot and a second side defined by a second slot adjacent to the first slot. The first tooth portion has a first width that is the photovoltaic cell width multiplied by a first positive integer. A second tooth portion has a first side defined by a third slot and a second side defined by a fourth slot adjacent to the third slot. The second tooth portion has a second width that is the photovoltaic cell width multiplied by a second positive integer different than the first positive integer.

20 Claims, 12 Drawing Sheets

Related U.S. Application Data

(60) Provisional application No. 63/091,017, filed on Oct. 13, 2020.

(51) Int. Cl.
  *E04D 1/30* (2006.01)
  *H02S 20/25* (2014.01)
  *H02S 40/34* (2014.01)
  *E04D 1/00* (2006.01)

(52) U.S. Cl.
  CPC ........ *H02S 40/34* (2014.12); *E04D 2001/005* (2013.01); *E04D 2001/308* (2013.01)

(56) References Cited

U.S. PATENT DOCUMENTS

| | | | |
|---|---|---|---|
| 3,581,779 | A | 6/1971 | Gilbert, Jr. |
| 4,258,948 | A | 3/1981 | Hoffmann |
| 4,349,220 | A | 9/1982 | Carroll et al. |
| 4,499,702 | A | 2/1985 | Turner |
| 4,636,577 | A | 1/1987 | Peterpaul |
| 5,167,579 | A | 12/1992 | Rotter |
| 5,437,735 | A | 8/1995 | Younan et al. |
| 5,590,495 | A | 1/1997 | Bressler et al. |
| 5,642,596 | A | 7/1997 | Waddington |
| 5,992,112 | A | 11/1999 | Josey |
| 6,008,450 | A | 12/1999 | Ohtsuka et al. |
| 6,033,270 | A | 3/2000 | Stuart |
| 6,046,399 | A | 4/2000 | Kapner |
| 6,105,331 | A | 8/2000 | Rinklake et al. |
| 6,176,059 | B1 | 1/2001 | Cantarano et al. |
| 6,201,180 | B1 | 3/2001 | Meyer et al. |
| 6,220,329 | B1 | 4/2001 | King et al. |
| 6,308,482 | B1 | 10/2001 | Strait |
| 6,320,114 | B1 | 11/2001 | Kuechler |
| 6,320,115 | B1 | 11/2001 | Kataoka et al. |
| 6,336,304 | B1 | 1/2002 | Mimura et al. |
| 6,341,454 | B1 | 1/2002 | Koleoglou |
| 6,407,329 | B1 | 6/2002 | Iino et al. |
| 6,550,215 | B1 | 4/2003 | Pulte |
| 6,576,830 | B2 | 6/2003 | Nagao et al. |
| 6,928,781 | B2 | 8/2005 | Desbois et al. |
| 6,972,367 | B2 | 12/2005 | Federspiel et al. |
| 7,138,578 | B2 | 11/2006 | Komamine |
| 7,155,870 | B2 | 1/2007 | Almy |
| 7,178,295 | B2 | 2/2007 | Dinwoodie |
| 7,487,771 | B1 | 2/2009 | Eiffert et al. |
| 7,587,864 | B2 | 9/2009 | McCaskill et al. |
| 7,666,491 | B2 | 2/2010 | Yang et al. |
| 7,678,990 | B2 | 3/2010 | McCaskill et al. |
| 7,678,991 | B2 | 3/2010 | McCaskill et al. |
| 7,748,191 | B2 | 7/2010 | Podirsky |
| 7,819,114 | B2 | 10/2010 | Augenbraun et al. |
| 7,824,191 | B1 | 11/2010 | Podirsky |
| 7,832,176 | B2 | 11/2010 | McCaskill et al. |
| 8,118,109 | B1 | 2/2012 | Hacker |
| 8,168,880 | B2 | 5/2012 | Jacobs et al. |
| 8,173,889 | B2 | 5/2012 | Kalkanoglu et al. |
| 8,210,570 | B1 | 7/2012 | Railkar et al. |
| 8,276,329 | B2 | 10/2012 | Lenox |
| 8,312,693 | B2 | 11/2012 | Cappelli |
| 8,319,093 | B2 | 11/2012 | Kalkanoglu et al. |
| 8,333,040 | B2 | 12/2012 | Shiao et al. |
| 8,371,076 | B2 | 2/2013 | Jones et al. |
| 8,375,653 | B2 | 2/2013 | Shiao et al. |
| 8,404,967 | B2 | 3/2013 | Kalkanoglu et al. |
| 8,410,349 | B2 | 4/2013 | Kalkanoglu et al. |
| 8,418,415 | B2 | 4/2013 | Shiao et al. |
| 8,438,796 | B2 | 5/2013 | Shiao et al. |
| 8,468,754 | B2 | 6/2013 | Railkar et al. |
| 8,468,757 | B2 | 6/2013 | Krause et al. |
| 8,505,249 | B2 | 8/2013 | Geary |
| 8,512,866 | B2 | 8/2013 | Taylor |
| 8,513,517 | B2 | 8/2013 | Kalkanoglu et al. |
| 8,586,856 | B2 | 11/2013 | Kalkanoglu et al. |
| 8,601,754 | B2 | 12/2013 | Jenkins et al. |
| 8,623,499 | B2 | 1/2014 | Viasnoff |
| 8,629,578 | B2 | 1/2014 | Kurs et al. |
| 8,646,228 | B2 | 2/2014 | Jenkins |
| 8,656,657 | B2 | 2/2014 | Livsey et al. |
| 8,671,630 | B2 | 3/2014 | Lena et al. |
| 8,677,702 | B2 | 3/2014 | Jenkins |
| 8,695,289 | B2 | 4/2014 | Koch et al. |
| 8,713,858 | B1 | 5/2014 | Xie |
| 8,713,860 | B2 | 5/2014 | Railkar et al. |
| 8,733,036 | B2 | 5/2014 | Salam |
| 8,733,038 | B2 | 5/2014 | Kalkanoglu et al. |
| 8,776,455 | B2 | 7/2014 | Azoulay |
| 8,789,321 | B2 | 7/2014 | Ishida |
| 8,793,940 | B2 | 8/2014 | Kalkanoglu et al. |
| 8,793,941 | B2 | 8/2014 | Bosler et al. |
| 8,826,607 | B2 | 9/2014 | Shiao et al. |
| 8,835,751 | B2 | 9/2014 | Kalkanoglu et al. |
| 8,863,451 | B2 | 10/2014 | Jenkins et al. |
| 8,898,970 | B2 | 12/2014 | Jenkins et al. |
| 8,925,262 | B2 | 1/2015 | Railkar et al. |
| 8,943,766 | B2 | 2/2015 | Gombarick et al. |
| 8,946,544 | B2 | 2/2015 | Jabos et al. |
| 8,950,128 | B2 | 2/2015 | Kalkanoglu et al. |
| 8,959,848 | B2 | 2/2015 | Jenkins et al. |
| 8,966,838 | B2 | 3/2015 | Jenkins |
| 8,966,850 | B2 | 3/2015 | Jenkins et al. |
| 8,994,224 | B2 | 3/2015 | Mehta et al. |
| 9,032,672 | B2 | 5/2015 | Livsey et al. |
| 9,059,348 | B1 | 6/2015 | Quinlan et al. |
| 9,145,498 | B2 | 9/2015 | Ultsch |
| 9,153,950 | B2 | 10/2015 | Yamanaka et al. |
| 9,166,087 | B2 | 10/2015 | Chihlas et al. |
| 9,169,646 | B2 | 10/2015 | Rodrigues et al. |
| 9,170,034 | B2 | 10/2015 | Bosler et al. |
| 9,171,991 | B2 | 10/2015 | Pearce |
| 9,178,465 | B2 | 11/2015 | Shiao et al. |
| 9,202,955 | B2 | 12/2015 | Livsey et al. |
| 9,212,832 | B2 | 12/2015 | Jenkins |
| 9,217,584 | B2 | 12/2015 | Kalkanoglu et al. |
| 9,270,221 | B2 | 2/2016 | Zhao |
| 9,273,885 | B2 | 3/2016 | Rordigues et al. |
| 9,276,141 | B2 | 3/2016 | Kalkanoglu et al. |
| 9,331,224 | B2 | 5/2016 | Koch et al. |
| 9,356,174 | B2 | 5/2016 | Duarte et al. |
| 9,359,014 | B1 | 6/2016 | Yang et al. |
| 9,412,890 | B1 | 8/2016 | Meyers |
| 9,528,270 | B2 | 12/2016 | Jenkins et al. |
| 9,605,432 | B1 | 3/2017 | Robbins |
| 9,670,353 | B2 | 6/2017 | Peng et al. |
| 9,711,672 | B2 | 7/2017 | Wang |
| 9,755,573 | B2 | 9/2017 | Livsey et al. |
| 9,786,802 | B2 | 10/2017 | Shiao et al. |
| 9,831,818 | B2 | 11/2017 | West |
| D805,211 | S | 12/2017 | Wu |
| 9,912,284 | B2 | 3/2018 | Svec |
| 9,920,515 | B2 | 3/2018 | Xing et al. |
| 9,923,515 | B2 | 3/2018 | Rodrigues et al. |
| 9,938,729 | B2 | 4/2018 | Coon |
| 9,987,786 | B2 | 6/2018 | Stoiljkovic et al. |
| 9,991,412 | B2 | 6/2018 | Gonzalez et al. |
| 9,998,067 | B2 | 6/2018 | Kalkanoglu et al. |
| 10,015,933 | B2 | 7/2018 | Boldrin |
| 10,027,273 | B2 | 7/2018 | West et al. |
| 10,115,850 | B2 | 10/2018 | Rodrigues et al. |
| 10,128,660 | B1 | 11/2018 | Apte et al. |
| 10,156,075 | B1 | 12/2018 | McDonough |
| 10,179,852 | B2 | 1/2019 | Gossi et al. |
| 10,187,005 | B2 | 1/2019 | Rodrigues et al. |
| 10,256,765 | B2 | 4/2019 | Rodrigues et al. |
| 10,284,136 | B1 | 5/2019 | Mayfield et al. |
| 10,454,408 | B2 | 10/2019 | Livsey et al. |
| 10,480,192 | B2 | 11/2019 | Xing et al. |
| 10,530,292 | B1 | 1/2020 | Cropper et al. |
| 10,560,048 | B2 | 2/2020 | Fisher et al. |
| 10,563,406 | B2 | 2/2020 | Kalkanoglu et al. |
| D879,031 | S | 3/2020 | Lance et al. |
| 10,579,028 | B1 | 3/2020 | Jacob |
| 10,584,493 | B2 | 3/2020 | Jenkins et al. |

(56) References Cited

U.S. PATENT DOCUMENTS

| | | |
|---|---|---|
| 10,669,414 B2 | 6/2020 | Li et al. |
| 10,738,473 B2 | 8/2020 | De Ridder et al. |
| 10,784,813 B2 | 9/2020 | Kalkanoglu et al. |
| D904,289 S | 12/2020 | Lance et al. |
| 10,907,355 B2 | 2/2021 | Hubbard et al. |
| 10,914,063 B2 | 2/2021 | Lee et al. |
| RE48,555 E | 5/2021 | Cancio et al. |
| 11,012,025 B2 * | 5/2021 | Seery ............... H02S 30/10 |
| 11,012,026 B2 | 5/2021 | Kalkanoglu et al. |
| 11,015,085 B2 | 5/2021 | Bruns et al. |
| 11,065,849 B2 | 7/2021 | Ackermann et al. |
| 11,177,639 B1 | 11/2021 | Nguyen et al. |
| 11,217,715 B2 | 1/2022 | Sharenko et al. |
| 11,251,744 B1 | 2/2022 | Bunea |
| 11,258,399 B2 | 2/2022 | Kalkanoglu et al. |
| 11,283,394 B2 | 3/2022 | Perkins et al. |
| 11,309,828 B2 | 4/2022 | Sirski et al. |
| 11,394,344 B2 | 7/2022 | Perkins et al. |
| 11,424,379 B2 | 8/2022 | Sharenko et al. |
| 11,431,280 B2 | 8/2022 | Liu et al. |
| 11,431,281 B2 | 8/2022 | Perkins et al. |
| 11,444,569 B2 | 9/2022 | Clemente et al. |
| 11,454,027 B2 | 9/2022 | Kuiper et al. |
| 11,459,757 B2 | 10/2022 | Nguyen et al. |
| 11,486,144 B2 | 11/2022 | Bunea et al. |
| 11,489,482 B2 | 11/2022 | Peterson et al. |
| 11,496,088 B2 | 11/2022 | Sirski et al. |
| 11,508,861 B1 | 11/2022 | Perkins et al. |
| 11,512,480 B1 | 11/2022 | Achor et al. |
| 11,527,665 B2 | 12/2022 | Boitnott |
| 11,545,927 B2 | 1/2023 | Abra et al. |
| 11,545,928 B2 | 1/2023 | Perkins et al. |
| 11,658,470 B2 | 5/2023 | Nguyen et al. |
| 11,661,745 B2 | 5/2023 | Bunea et al. |
| 11,689,149 B2 | 6/2023 | Clemente et al. |
| 11,705,531 B2 | 7/2023 | Sharenko et al. |
| 11,728,759 B2 | 8/2023 | Nguyen et al. |
| 11,732,490 B2 | 8/2023 | Achor et al. |
| 11,811,361 B1 | 11/2023 | Farhangi et al. |
| 11,824,486 B2 | 11/2023 | Nguyen et al. |
| 11,824,487 B2 | 11/2023 | Nguyen et al. |
| 11,843,067 B2 | 12/2023 | Nguyen et al. |
| 2002/0053360 A1 | 5/2002 | Kinoshita et al. |
| 2002/0102422 A1 | 8/2002 | Hubbard et al. |
| 2002/0129849 A1 | 9/2002 | Heckeroth |
| 2003/0101662 A1 | 6/2003 | Ullman |
| 2003/0132265 A1 | 7/2003 | Villela et al. |
| 2003/0217768 A1 | 11/2003 | Guha |
| 2004/0000334 A1 | 1/2004 | Ressler |
| 2004/0221886 A1 | 11/2004 | Oono |
| 2005/0030187 A1 | 2/2005 | Peress et al. |
| 2005/0115603 A1 | 6/2005 | Yoshida et al. |
| 2005/0144870 A1 | 7/2005 | Dinwoodie |
| 2005/0178428 A1 | 8/2005 | Laaly et al. |
| 2005/0193673 A1 | 9/2005 | Rodrigues et al. |
| 2006/0042683 A1 | 3/2006 | Gangemi |
| 2006/0046084 A1 | 3/2006 | Yang et al. |
| 2007/0074757 A1 | 4/2007 | Mellott et al. |
| 2007/0181174 A1 | 8/2007 | Ressler |
| 2007/0193618 A1 | 8/2007 | Bressler et al. |
| 2007/0249194 A1 | 10/2007 | Liao |
| 2007/0295385 A1 | 12/2007 | Sheats et al. |
| 2008/0006323 A1 | 1/2008 | Kalkanoglu et al. |
| 2008/0035140 A1 | 2/2008 | Placer et al. |
| 2008/0078440 A1 | 4/2008 | Lim et al. |
| 2008/0185748 A1 | 8/2008 | Kalkanoglu |
| 2008/0271774 A1 | 11/2008 | Kalkanoglu et al. |
| 2008/0302030 A1 | 12/2008 | Stancel et al. |
| 2008/0315061 A1 | 12/2008 | Fath |
| 2009/0000222 A1 | 1/2009 | Kalkanoglu et al. |
| 2009/0014057 A1 | 1/2009 | Croft et al. |
| 2009/0014058 A1 | 1/2009 | Croft et al. |
| 2009/0019795 A1 | 1/2009 | Szacsvay et al. |
| 2009/0044850 A1 | 2/2009 | Kimberley |
| 2009/0114261 A1 | 5/2009 | Stancel et al. |
| 2009/0133340 A1 | 5/2009 | Shiao et al. |
| 2009/0159118 A1 | 6/2009 | Kalkanoglu et al. |
| 2009/0178350 A1 | 7/2009 | Kalkanoglu et al. |
| 2009/0229652 A1 | 9/2009 | Mapel et al. |
| 2009/0275247 A1 | 11/2009 | Richter et al. |
| 2010/0019580 A1 | 1/2010 | Croft et al. |
| 2010/0095618 A1 | 4/2010 | Edison et al. |
| 2010/0101634 A1 | 4/2010 | Frank et al. |
| 2010/0116325 A1 | 5/2010 | Nikoonahad |
| 2010/0131108 A1 | 5/2010 | Meyer |
| 2010/0139184 A1 | 6/2010 | Williams et al. |
| 2010/0146878 A1 | 6/2010 | Koch et al. |
| 2010/0159221 A1 | 6/2010 | Kourtakis et al. |
| 2010/0170169 A1 | 7/2010 | Railkar et al. |
| 2010/0186798 A1 | 7/2010 | Tormen et al. |
| 2010/0242381 A1 | 9/2010 | Jenkins |
| 2010/0313499 A1 | 12/2010 | Gangemi |
| 2010/0325976 A1 | 12/2010 | DeGenfelder et al. |
| 2010/0326488 A1 | 12/2010 | Aue et al. |
| 2010/0326501 A1 | 12/2010 | Zhao et al. |
| 2011/0030761 A1 | 2/2011 | Kalkanoglu et al. |
| 2011/0036386 A1 | 2/2011 | Browder |
| 2011/0036389 A1 | 2/2011 | Hardikar et al. |
| 2011/0048507 A1 | 3/2011 | Livsey et al. |
| 2011/0058337 A1 | 3/2011 | Han et al. |
| 2011/0061326 A1 | 3/2011 | Jenkins |
| 2011/0100436 A1 | 5/2011 | Cleereman et al. |
| 2011/0104488 A1 | 5/2011 | Muessig et al. |
| 2011/0132427 A1 | 6/2011 | Kalkanoglu et al. |
| 2011/0168238 A1 | 7/2011 | Metin et al. |
| 2011/0239555 A1 | 10/2011 | Cook et al. |
| 2011/0302859 A1 | 12/2011 | Crasnianski |
| 2011/0314753 A1 | 12/2011 | Farmer et al. |
| 2012/0034799 A1 | 2/2012 | Hunt |
| 2012/0060434 A1 | 3/2012 | Jacobs |
| 2012/0060902 A1 | 3/2012 | Drake |
| 2012/0085392 A1 | 4/2012 | Albert et al. |
| 2012/0137600 A1 | 6/2012 | Jenkins |
| 2012/0176077 A1 | 7/2012 | Oh et al. |
| 2012/0212065 A1 | 8/2012 | Cheng et al. |
| 2012/0233940 A1 | 9/2012 | Perkins et al. |
| 2012/0240490 A1 | 9/2012 | Gangemi |
| 2012/0260977 A1 | 10/2012 | Stancel |
| 2012/0266942 A1 | 10/2012 | Komatsu et al. |
| 2012/0279150 A1 | 11/2012 | Pislkak et al. |
| 2012/0282437 A1 | 11/2012 | Clark et al. |
| 2012/0291848 A1 | 11/2012 | Sherman et al. |
| 2013/0008499 A1 | 1/2013 | Verger et al. |
| 2013/0014455 A1 | 1/2013 | Grieco |
| 2013/0118558 A1 | 5/2013 | Sherman |
| 2013/0193769 A1 | 8/2013 | Mehta et al. |
| 2013/0247988 A1 | 9/2013 | Reese et al. |
| 2013/0284267 A1 | 10/2013 | Plug et al. |
| 2013/0306137 A1 | 11/2013 | Ko |
| 2014/0090697 A1 | 4/2014 | Rodrigues et al. |
| 2014/0150843 A1 | 6/2014 | Pearce et al. |
| 2014/0173997 A1 | 6/2014 | Jenkins |
| 2014/0179220 A1 | 6/2014 | Railkar et al. |
| 2014/0182222 A1 | 7/2014 | Kalkanoglu et al. |
| 2014/0208675 A1 | 7/2014 | Beerer et al. |
| 2014/0254776 A1 | 9/2014 | O'Connor et al. |
| 2014/0266289 A1 | 9/2014 | Della Sera et al. |
| 2014/0311556 A1 | 10/2014 | Feng et al. |
| 2014/0352760 A1 | 12/2014 | Haynes et al. |
| 2014/0366464 A1 | 12/2014 | Rodrigues et al. |
| 2015/0024159 A1 | 1/2015 | Bess et al. |
| 2015/0089895 A1 | 4/2015 | Leitch |
| 2015/0162459 A1 | 6/2015 | Lu et al. |
| 2015/0340516 A1 | 11/2015 | Kim et al. |
| 2015/0349173 A1 | 12/2015 | Morad et al. |
| 2015/0354224 A1 | 12/2015 | Maurer et al. |
| 2016/0105144 A1 | 4/2016 | Haynes et al. |
| 2016/0142008 A1 | 5/2016 | Lopez et al. |
| 2016/0254776 A1 | 9/2016 | Rodrigues et al. |
| 2016/0276508 A1 | 9/2016 | Huang et al. |
| 2016/0359451 A1 | 12/2016 | Mao et al. |
| 2017/0159292 A1 | 6/2017 | Chihlas et al. |
| 2017/0179319 A1 | 6/2017 | Yamashita et al. |
| 2017/0179726 A1 | 6/2017 | Garrity et al. |

(56) References Cited

U.S. PATENT DOCUMENTS

| | | |
|---|---|---|
| 2017/0203555 A1 | 7/2017 | Wang et al. |
| 2017/0237390 A1 | 8/2017 | Hudson et al. |
| 2017/0331415 A1 | 11/2017 | Koppi et al. |
| 2018/0094438 A1 | 4/2018 | Wu et al. |
| 2018/0094439 A1 | 4/2018 | Wang et al. |
| 2018/0097472 A1 | 4/2018 | Anderson et al. |
| 2018/0115275 A1 | 4/2018 | Flanigan et al. |
| 2018/0254738 A1 | 9/2018 | Yang et al. |
| 2018/0281347 A1 | 10/2018 | Gossi |
| 2018/0294765 A1 | 10/2018 | Friedrich et al. |
| 2018/0351502 A1 | 12/2018 | Almy et al. |
| 2018/0367089 A1 | 12/2018 | Stutterheim et al. |
| 2019/0030867 A1 | 1/2019 | Sun et al. |
| 2019/0081436 A1 | 3/2019 | Onodi et al. |
| 2019/0123679 A1 | 4/2019 | Rodrigues et al. |
| 2019/0253022 A1 | 8/2019 | Hardar et al. |
| 2019/0305717 A1 | 10/2019 | Allen et al. |
| 2020/0020819 A1* | 1/2020 | Farhangi ............... H01L 31/042 |
| 2020/0109320 A1 | 4/2020 | Jiang |
| 2020/0144958 A1 | 5/2020 | Rodrigues et al. |
| 2020/0220819 A1 | 7/2020 | Vu et al. |
| 2020/0224419 A1 | 7/2020 | Boss et al. |
| 2020/0343397 A1 | 10/2020 | Hem-Jensen |
| 2021/0002898 A1 | 1/2021 | Knebel et al. |
| 2021/0083619 A1 | 3/2021 | Hegedus |
| 2021/0095474 A1 | 4/2021 | Yang et al. |
| 2021/0113970 A1 | 4/2021 | Stainer et al. |
| 2021/0115223 A1 | 4/2021 | Bonekamp et al. |
| 2021/0159353 A1 | 5/2021 | Li et al. |
| 2021/0171808 A1 | 6/2021 | Ackermann et al. |
| 2021/0172174 A1 | 6/2021 | Ackermann et al. |
| 2021/0301536 A1 | 9/2021 | Baggs et al. |
| 2021/0343886 A1 | 11/2021 | Sharenko et al. |
| 2022/0149213 A1 | 5/2022 | Mensink et al. |

FOREIGN PATENT DOCUMENTS

| | | |
|---|---|---|
| CN | 202797032 U | 3/2013 |
| CN | 217150978 U | 8/2022 |
| DE | 1958248 A1 | 11/1971 |
| EP | 1039361 A1 | 9/2000 |
| EP | 1837162 A1 | 9/2007 |
| EP | 1774372 A1 | 7/2011 |
| EP | 2446481 A2 | 5/2012 |
| EP | 2784241 A1 | 10/2014 |
| EP | 3772175 A1 | 2/2021 |
| JP | 10046767 A | 2/1998 |
| JP | 2002-106151 A | 4/2002 |
| JP | 2001-098703 A | 10/2002 |
| JP | 2017-027735 A | 2/2017 |
| JP | 2018053707 A | 4/2018 |
| KR | 20090084060 A | 8/2009 |
| KR | 10-1348283 B1 | 1/2014 |
| KR | 10-2019-0000367 A | 1/2019 |
| KR | 10-2253483 B1 | 5/2021 |
| NL | 2026856 B1 | 6/2022 |
| WO | 2010/151777 A2 | 12/2010 |
| WO | 2011/049944 A1 | 4/2011 |
| WO | 2015/133632 A1 | 9/2015 |
| WO | 2018/000589 A1 | 1/2018 |
| WO | 2019/201416 A1 | 10/2019 |
| WO | 2020-159358 A1 | 8/2020 |
| WO | 2021-247098 A1 | 12/2021 |

OTHER PUBLICATIONS

RGS Energy, 3.5kW PowerHouse 3.0 system installed in an afternoon; Jun. 7, 2019 <<facebook.com/RGSEnergy/>> retrieved Feb. 2, 2021.

Tesla, Solar Roof <<tesla.com/solarroof>> retrieved Feb. 2, 2021.

"Types of Roofing Underlayment", Owens Corning Roofing; <<https://www.owenscorning.com/en-us/roofing/tools/how-roofing-underlayment-helps-protect-your-home>> retrieved Nov. 1, 2021.

* cited by examiner

SOLAR ROOFING SYSTEM

CROSS-REFERENCE TO RELATED APPLICATION

This application is a continuation of U.S. patent application Ser. No. 17/499,516, filed on Oct. 12, 2021, entitled "SOLAR ROOFING SYSTEM", which claims the benefit of U.S. Provisional Patent Application Ser. No. 63/091,017, filed Oct. 13, 2020, entitled "SOLAR ROOFING SYSTEM," the contents of which are incorporated herein by reference in its entirety.

FIELD OF THE INVENTION

The present invention relates to solar roofing systems including roof-integrated photovoltaic modules and roofing shingles. More particularly, the present invention relates to solar roofing systems including roof-integrated photovoltaic modules and roofing shingles having elements with matching widths.

BACKGROUND

Solar modules can be placed on building roofs (e.g., residential roofs) to generate electricity. One obstacle to mass-market adoption of solar roofing is poor aesthetics. Standard rack-mounted photovoltaic ("PV") systems have a very different appearance than traditional roofing materials (e.g., asphalt shingles, wooden shingles, slate shingles, etc.), which can draw unwanted attention. Even low-profile PV systems still receive poor aesthetic feedback from consumers.

Specifically, typical PV module materials and circuit formations include PV elements having a constant width and a grid-like appearance, while typical roofing shingles include elements having irregular viewed widths, causing the PV modules not to visually match the look of standard roofing shingles.

SUMMARY

In some embodiments, a system, comprising a photovoltaic module comprising a plurality of photovoltaic cells, wherein each of the plurality of photovoltaic cells has a photovoltaic cell width; and a roofing shingle having a top surface and a bottom surface, the roofing shingle having an exposure zone at a lower end of the top surface and a headlap zone at an upper end of the top surface, wherein a plurality of slots extends from the lower end toward the headlap zone, wherein the plurality of slots defines a plurality of tooth portions therebetween, wherein a first one of the plurality of tooth portions has a first side that is defined by a first one of the plurality of slots and a second side that is defined by a second one of the plurality of slots that is adjacent to the first one of the plurality of slots, wherein the first one of the plurality of tooth portions has a first width that is measured from the first one of the plurality of slots to the second one of the plurality of slots, wherein the first width is the photovoltaic cell width multiplied by a first positive integer, wherein a second one of the plurality of tooth portions has a first side that is defined by a third one of the plurality of slots and a second side that is defined by a fourth one of the plurality of slots that is adjacent to the third one of the plurality of slots, wherein the second one of the plurality of tooth portions has a second width that is measured from the third one of the plurality of slots to the fourth one of the plurality of slots, and wherein the second width is the photovoltaic cell width multiplied by a second positive integer that is different than the first positive integer.

In some embodiments, a third one of the plurality of tooth portions has a first side that is defined by a fifth one of the plurality of slots and a second side that is defined by a sixth one of the plurality of slots that is adjacent to the fifth one of the plurality of slots, and wherein the third one of the plurality of tooth portions has a third width that is measured from the fifth one of the plurality of slots to the sixth one of the plurality of slots, wherein the third width is the photovoltaic cell width multiplied by 0.5 and by a third positive integer that is different than the first positive integer and different than the second positive integer. In some embodiments, each of the first and second positive integers is selected from the group consisting of 1, 2, 3, 4, 5, 6, 7, 8, 9, 10, 11, 12, 13, 14, 15, 16, 17, 18, 19, and 20. In some embodiments, the roofing shingle comprises thermoplastic olefin, polyvinyl chloride, or asphalt. In some embodiments, the top surface of the roofing shingle comprises embedded granules.

In some embodiments, a third one of the plurality of tooth portions has a first side that is defined by a fifth one of the plurality of slots and a second side that is defined by one of either (a) the first side, or (b) the second side, and wherein the third one of the plurality of tooth portions has a third width that is measured from the fifth one of the plurality of slots to the one of either the first side or the second side, wherein the third width is the photovoltaic cell width multiplied by 0.5 and by a third positive integer that is different than the first positive integer and different than the second positive integer.

In some embodiments, the system further includes a second roofing shingle having a top surface and a bottom surface, the second roofing shingle having an exposure zone at a lower end of the top surface of the second roofing shingle and a headlap zone at an upper end of the top surface of the second roofing shingle, wherein a plurality of slots extends from the lower end of the second roofing shingle toward the headlap zone of the second roofing shingle, wherein the plurality of slots of the second roofing shingle defines a plurality of tooth portions therebetween, wherein a first one of the plurality of tooth portions of the second roofing shingle has a first side that is defined by a first one of the plurality of slots of the second roofing shingle and a second side that is defined by a second one of the plurality of slots of the second roofing shingle that is adjacent to the first one of the plurality of slots of the second roofing shingle, wherein the first one of the plurality of tooth portions of the second roofing shingle has a third width that is measured from the first one of the plurality of slots of the second roofing shingle to the second one of the plurality of slots of the second roofing shingle, wherein the third width is the photovoltaic cell width multiplied by a third positive integer, wherein a second one of the plurality of tooth portions of the second roofing shingle has a first side that is defined by a third one of the plurality of slots of the second roofing shingle and a second side that is defined by a fourth one of the plurality of slots of the second roofing shingle that is adjacent to the third one of the plurality of slots of the second roofing shingle, wherein the second one of the plurality of tooth portions of the second roofing shingle has a fourth width that is measured from the third one of the plurality of slots of the second roofing shingle to the fourth one of the plurality of slots of the second roofing shingle, and wherein the fourth width is the photovoltaic cell width multiplied by a fourth positive integer that is different than the third positive integer.

In some embodiments, an arrangement of the tooth portions of the second roofing shingle is not identical to an arrangement of the tooth portions of the roofing shingle. In some embodiments, an arrangement of the tooth portions of the second roofing shingle is identical to an arrangement of the tooth portions of the roofing shingle. In some embodiments, the third one of the plurality of slots is a same one of the plurality of slots as the second one of the plurality of slots, and wherein the first one of the plurality of tooth portions is adjacent to the second one of the plurality of tooth portions.

In some embodiments, the system further includes a wireway configured to be positioned between the photovoltaic module and a further photovoltaic module that is adjacent to the photovoltaic module, wherein the wireway is configured to enclose at least one electrical cable, wherein a width of the wireway as measured in a horizontal direction between the photovoltaic module and the further photovoltaic module is the photovoltaic cell width multiplied by two, wherein the wireway includes a dark colored portion and a light colored portion, and wherein the light colored portion extends across the wireway in a vertical direction that is perpendicular to the horizontal direction. In some embodiments, the light-colored portion is positioned at an edge of the wireway that is adjacent to the photovoltaic module. In some embodiments, the light-colored portion is positioned halfway intermediate (1) an edge of the wireway that is adjacent to the photovoltaic module and (2) an edge of the wireway that is adjacent to the further photovoltaic module. In some embodiments, the wireway further comprises a further light colored portion extending across a bottom edge of the wireway in the horizontal direction.

In some embodiments, a roofing shingle includes a top surface and a bottom surface, the roofing shingle having an exposure zone at a lower end of the top surface and a headlap zone at an upper end of the top surface, wherein the roofing shingle is configured to be installed on a roof adjacent to a photovoltaic module including a plurality of photovoltaic cells, wherein each of the plurality of photovoltaic cells has a photovoltaic cell width, wherein a plurality of slots extends from the lower end toward the headlap zone, wherein the plurality of slots defines a plurality of tooth portions therebetween, wherein a first one of the plurality of tooth portions has a first side that is defined by a first one of the plurality of slots and a second side that is defined by a second one of the plurality of slots that is adjacent to the first one of the plurality of slots, wherein the first one of the plurality of tooth portions has a first width that is measured from the first one of the plurality of slots to the second one of the plurality of slots, wherein the first width is the photovoltaic cell width multiplied by a first positive integer, wherein a second one of the plurality of tooth portions has a first side that is defined by a third one of the plurality of slots and a second side that is defined by a fourth one of the plurality of slots that is adjacent to the third one of the plurality of slots, wherein the second one of the plurality of tooth portions has a second width that is measured from the third one of the plurality of slots to the fourth one of the plurality of slots, and wherein the second width is the photovoltaic cell width multiplied by a second positive integer that is different than the first positive integer.

In some embodiments, a third one of the plurality of tooth portions has a first side that is defined by a fifth one of the plurality of slots and a second side that is defined by a sixth one of the plurality of slots that is adjacent to the fifth one of the plurality of slots, wherein the third one of the plurality of tooth portions has a third width that is measured from the fifth one of the plurality of slots to the sixth one of the plurality of slots, and wherein the third width is the photovoltaic cell width multiplied by a third positive integer that is different than the first positive integer and different than the second positive integer. In some embodiments, each of the first and second positive integers is selected from the group consisting of 1, 2, 3, 4, 5, 6, 7, 8, 9, 10, 11, 12, 13, 14, 15, 16, 17, 18, 19, and 20. In some embodiments, the roofing shingle comprises thermoplastic olefin, polyvinyl chloride, or asphalt. In some embodiments, the top surface of the roofing shingle comprises embedded granules. In some embodiments, a third one of the plurality of tooth portions has a first side that is defined by a fifth one of the plurality of slots and a second side that is defined by one of either (a) the first side, or (b) the second side, and wherein the third one of the plurality of tooth portions has a third width that is measured from the fifth one of the plurality of slots to the one of either the first side or the second side, wherein the third width is the photovoltaic cell width multiplied by a third positive integer that is different than the first positive integer and different than the second positive integer.

DETAILED DESCRIPTION

Figure 1:
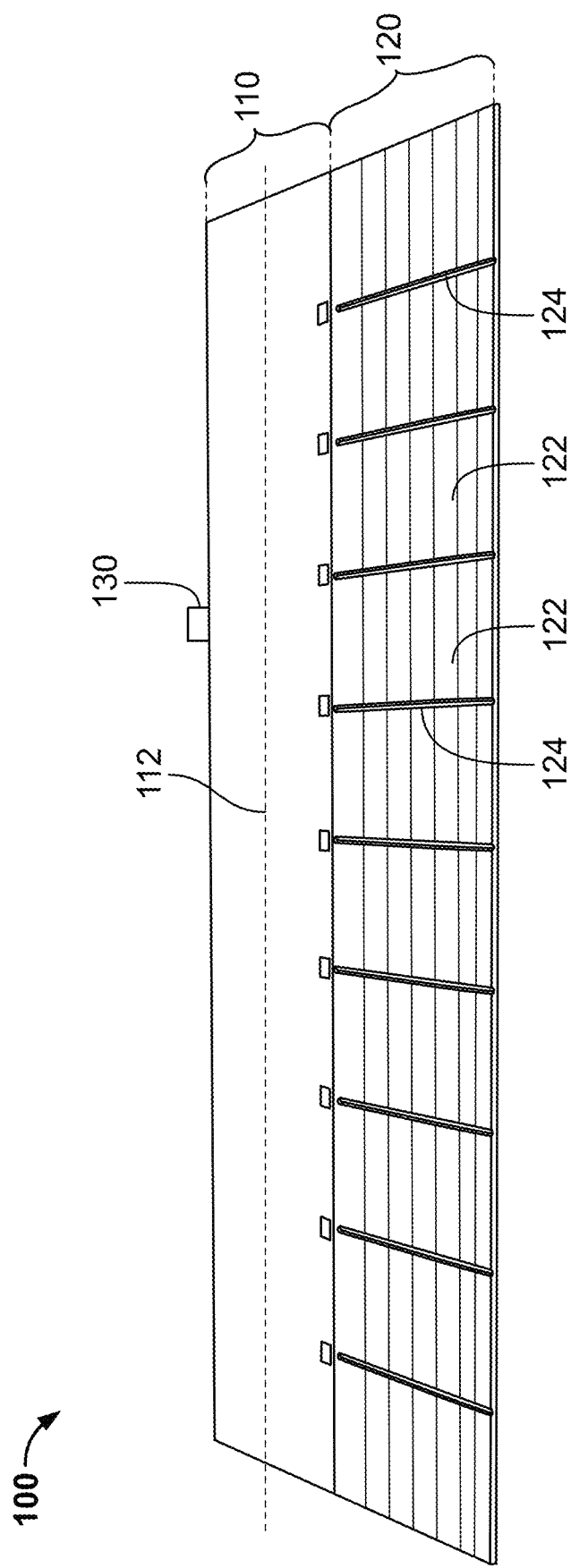
FIG. 1 shows a perspective view of an exemplary PV module.

The present invention will be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though they may. Furthermore, the phrases "in another embodiment" and "in some other embodiments" as used herein do not necessarily refer to a different embodiment, although they may. Thus, as described below, various embodiments of the invention may be readily combined, without departing from the scope or spirit of the invention.

The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The exemplary embodiments relate to a roofing system having elements (e.g., roofing shingles, PV modules, wireways, and masking elements) having visual elements the width of which is harmonized around a constant base width. In some embodiments, the constant base width is a cell pitch. In some embodiments, the cell pitch is defined as the width of a PV element plus the width of a space that exists between two adjacent PV elements. In some embodiments, such harmonization provides a consistent and blended aesthetic appearance across such a roofing system, as will be discussed in further detail hereinafter.

In some embodiments, a solar roofing system includes at least one PV module and at least one roofing shingle. In some embodiments, each of the at least one PV modules includes a plurality of PV cells. In some embodiments, each of the PV cells has a PV cell width that is the same for all of the PV cells. In some embodiments, the cell width is a "half-cut" width, e.g., the width of a premanufactured PV cell that has been cut in half.

FIG. 1 shows an exemplary PV module 100. The exemplary PV module 100 includes a headlap region 110 and a PV region 120. In some embodiments, the headlap region 110 comprises thermoplastic olefin ("TPO"), polyvinyl chloride ("PVC"), or asphalt. In some embodiments, the headlap region 110 includes embedded granules. In some embodiments, the headlap region 110 defines a nailing line 112 extending across the headlap region 110. In some embodiments, the nailing line 112 extends across the headlap region 110 approximately midway between the end of the headlap region 110 that borders the PV region and the opposite end of the headlap region 110. In some embodiments, the nailing line 112 defines an area of the headlap region 110 through which mechanical fasteners (e.g., nails, screws, etc.) can be driven to secure the PV module 100 to a roof deck in the standard manner.

In some embodiments, the PV region 120 includes a plurality of PV portions 122. In some embodiments, each of the PV portions 122 includes a layered structure that is typical of a laminate PV module, as discussed below with reference to FIGS. 2A and 2B. In some embodiments, the PV region 120 includes grooves 124 separating adjacent ones of the PV portions. In some embodiments, each of the PV portions 122 is separately formed from others of the PV portions 122, and the grooves 124 are formed by spaces between adjacent ones of the PV portions 122. In some embodiments, the PV portions 122 forming the PV region 120 are integrally formed with one another (e.g., form a single layered structure) and the grooves 124 are formed in a superstrate layer thereof. In some embodiments, the grooves 124 between adjacent ones of the PV portions 122 provide the appearance of discrete portions similar to those of conventional shingles. In some embodiments, the PV region 120 is formed atop material of the headlap region 110 (e.g., the substrate of the PV region 120 is deposited on the material of the headlap region 110). In some embodiments, the PV region 120 and the headlap region 110 join one another end-to-end.

In some embodiments, the PV module 100 includes a junction box 130. In some embodiments, the junction box 130 is positioned at an end of the headlap region 110 that is opposite the PV region 120. In some embodiments, the junction box 130 is positioned at a center of an end of the headlap region 110 that is opposite the PV region 120. In some embodiments, the junction box 130 is electrically connected to the PV region 120 by electrical connectors (e.g., wires) that traverse (e.g., pass under or through) the headlap region 110.

Figure 2A:
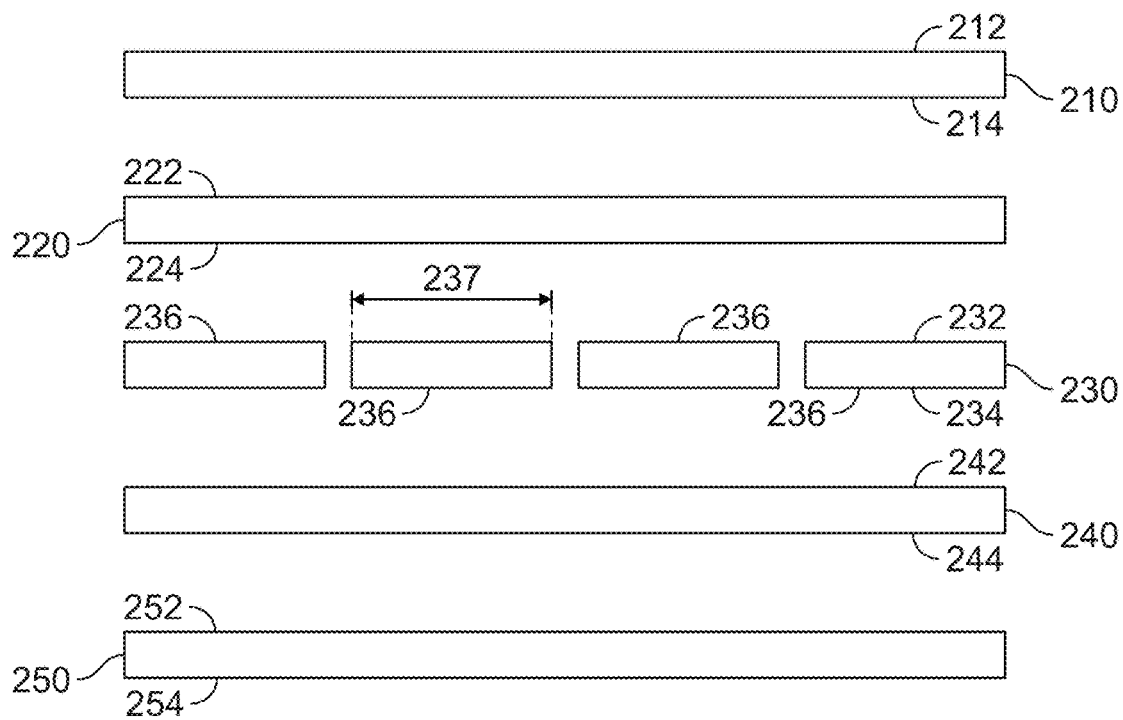
FIG. 2A shows a schematic view of elements of a layered structure of an exemplary PV module before lamination.
Figure 2B:
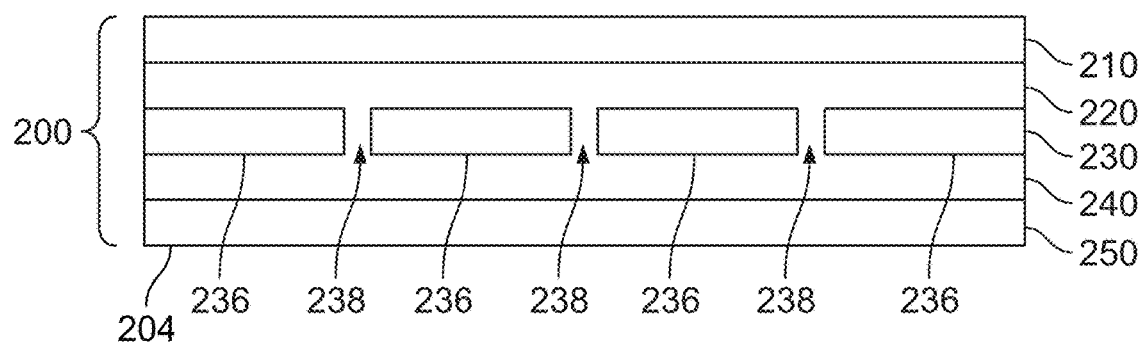
FIG. 2B shows a schematic view of a layered structure of an exemplary PV module formed by lamination of the elements shown in FIG. 2A.

In some embodiments, such as the PV module 100 discussed above with reference to FIG. 1, an exemplary PV module includes a layered structure. FIGS. 2A and 2B show an exemplary embodiment of a layered structure 200 that, in some embodiments, forms part of an exemplary PV module.

FIG. 2A shows an exploded view of the layers of the layered structure 200 prior to lamination to form the layered structure 200. FIG. 2B shows the layered structure following lamination. It will be apparent to those of skill in the art that FIGS. 2A and 2B present schematic views of the layered structure 200 and are not intended to provide a to-scale representation.

Referring now to FIG. 2A, in some embodiments, the layered structure 200 includes a superstrate layer 210 that forms an upper surface of the layered structure 200 and of the PV module 100 (i.e., the surface that, when the PV module 100 is installed on a roof, faces away from the roof and toward the sun). In some embodiments, the superstrate layer 210 has an upper surface 212 (i.e., the side of the superstrate layer 210 that faces toward the sun when installed as described above) and a lower surface 214 opposite the upper surface 212. In some embodiments, the superstrate layer 210 is optically transparent (e.g., it has a solar weighted transmittance of 80% or greater). In some embodiments, the superstrate provides electrical insulation and moisture resistance. In some embodiments, the superstrate layer 210 comprises a glass material, such as low-iron solar glass. In some embodiments, the superstrate layer 210 comprises a polymeric material such as ethylene tetrafluoroethylene ("ETFE"), polyethylene terephthalate ("PET"), or an acrylic such as polymethyl methacrylate ("PMMIA"). In some embodiments, the superstrate layer 210 has a thickness of from 50 microns to 250 microns. In some embodiments, the superstrate layer 210 has a thickness of from 50 microns to 200 microns. In some embodiments, the superstrate layer 210 has a thickness of from 50 microns to 150 microns. In some embodiments, the superstrate layer 210 has a thickness of from 50 microns to 100 microns. In some embodiments, the superstrate layer 210 has a thickness of from 100 microns to 250 microns. In some embodiments, the superstrate layer 210 has a thickness of from 100 microns to 200 microns. In some embodiments, the superstrate layer 210 has a thickness of from 100 microns to 150 microns. In some embodiments, the superstrate layer 210 has a thickness of from 150 microns to 250 microns. In some embodiments, the superstrate layer 210 has a thickness of from 150 microns to 200 microns. In some embodiments, the superstrate layer 210 has a thickness of from 200 microns to 250 microns.

In some embodiments, the superstrate layer 210 has a thickness of from 200 microns to 500 microns. In some embodiments, the superstrate layer 210 has a thickness of from 200 microns to 450 microns. In some embodiments, the superstrate layer 210 has a thickness of from 200 microns to 400 microns. In some embodiments, the superstrate layer 210 has a thickness of from 200 microns to 350 microns. In some embodiments, the superstrate layer 210 has a thickness of from 200 microns to 300 microns. In some embodiments, the superstrate layer 210 has a thickness of from 250 microns to 500 microns. In some embodiments, the superstrate layer 210 has a thickness of from 250 microns to 450 microns. In some embodiments, the superstrate layer 210 has a thickness of from 250 microns to 400 microns. In some embodiments, the superstrate layer 210 has a thickness of from 250 microns to 350 microns. In some embodiments, the superstrate layer 210 has a thickness of from 250 microns to 300 microns. In some embodiments, the superstrate layer 210 has a thickness of from 300 microns to 500 microns. In some embodiments, the superstrate layer 210 has a thickness of from 300 microns to 500 microns. In some embodiments, the superstrate layer 210 has a thickness of from 300 microns to 450 microns. In some embodiments, the superstrate layer 210 has a thickness of from 300 microns to 400 microns. In some embodiments, the superstrate layer 210 has a thickness of from 300 microns to 350 microns. In some embodiments, the superstrate layer 210 has a thickness of from 350 microns to 500 microns. In some embodiments, the superstrate layer 210 has a thickness of from 350 microns to 450 microns. In some embodiments, the superstrate layer 210 has a thickness of from 350 microns to 400 microns. In some embodiments, the superstrate layer 210 has a thickness of from 400 microns to 500 microns. In some embodiments, the superstrate layer 210 has a thickness of from 400 microns to 450 microns. In some embodiments, the superstrate layer 210 has a thickness of from 450 microns to 500 microns. In some embodiments, the superstrate layer 210 has a thickness of from 325 microns to 375 microns. In some embodiments, the superstrate layer 210 has a thickness of about 300 microns. In some embodiments, the superstrate layer 210 has a thickness of 300 microns.

In some embodiments, the superstrate layer 210 has a thickness of from 1.6 millimeters to 4 millimeters. In some embodiments, the superstrate layer 210 has a thickness of from 1.6 millimeters to 3.2 millimeters. In some embodiments, the superstrate layer 210 has a thickness of from 1.6 millimeters to 2.4 millimeters. In some embodiments, the superstrate layer 210 has a thickness of from 2.4 millimeters to 4 millimeters. In some embodiments, the superstrate layer 210 has a thickness of from 2.4 millimeters to 3.2 millimeters. In some embodiments, the superstrate layer 210 has a thickness of from 3.2 millimeters to 4 millimeters. In some embodiments, the superstrate layer 210 has a thickness of from 2.8 millimeters to 3.6 millimeters. In some embodiments, the superstrate layer 210 has a thickness of from 3 millimeters to 3.4 millimeters. In some embodiments, the superstrate layer 210 has a thickness of from 3.1 millimeters to 3.3 millimeters. In some embodiments, the superstrate layer 210 has a thickness about 3.2 millimeters. In some embodiments, the superstrate layer 210 has a thickness of 3.2 millimeters.

Continuing to refer to FIG. 2A, in some embodiments, the layered structure 200 includes an upper encapsulant layer 220. In some embodiments, the upper encapsulant layer 220 has an upper surface 222 and a lower surface 224 opposite the upper surface 222. In some embodiments, the upper surface 222 of the upper encapsulant layer 220 contacts the lower surface 214 of the superstrate layer 210. In some embodiments, the upper encapsulant layer 220 is optically transparent (e.g., it has a solar weighted transmittance of 80% or greater). In some embodiments, the upper encapsulant layer provides electrical insulation. In some embodiments, the upper encapsulant layer 220 comprises an encapsulating material such as ethylene-co-vinyl acetate ("EVA"), polydimethyl siloxane ("PDMS"), a polyolefin elastomer ("POE"), polyvinyl butyral ("PVB"), polyurethane epoxy, silicone, or an ionomer such as the series of ionomer-based encapsulants commercialized by DuPont de Nemours, Inc. under the trade name PV5400. In some embodiments, the thickness of the upper encapsulant layer 220 varies across the layered structure 200, as will be discussed in greater detail hereinafter.

Continuing to refer to FIG. 2A, in some embodiments, the layered structure 200 includes a PV layer 230 having an upper surface 232 and a lower surface 234 opposite the upper surface 232. In some embodiments, the upper surface 232 of the PV layer 230 contacts the lower surface 224 of the upper encapsulant layer 220. In some embodiments, the PV layer 230 includes at least one PV element 236 (e.g., at least one PV cell having a constant PV cell width 237 as described above). In some embodiments, the PV layer 230 includes an array of PV elements 236. In some embodiments in which the PV layer 230 includes a plurality of the PV element 236, the PV elements 236 are electrically interconnected with one another. In some embodiments, the PV layer 230 includes an array of interconnected PV elements 236. In some embodiments, gaps are formed between adjacent ones of the PV elements 236. In some embodiments, the gaps are significantly smaller than the PV elements 236; for example, in some embodiments, a width of each of the PV elements 236 is 160 millimeters and the gaps are from 2 millimeters to 5 millimeters in size. In some embodiments, the PV layer 230 also includes other active and/or passive electronic components.

Continuing to refer to FIG. 2A, in some embodiments, the layered structure 200 includes a lower encapsulant layer 240 having an upper surface 242 and a lower surface 244 opposite the upper surface 242. In some embodiments, the upper surface 242 of the lower encapsulant layer 240 contacts the lower surface 234 of the PV layer 230. In some embodiments, the lower encapsulant layer 240 provides electrical insulation. In some embodiments, the lower encapsulant layer 240 is optically transparent. In some embodiments, the lower encapsulant layer 240 is not optically transparent. In some embodiments, the thickness of the lower encapsulant layer 240 is in the range of 100 to 1000 microns. In some embodiments, the thickness of the lower encapsulant layer 240 is sufficiently large (e.g., greater than 100 microns) so as to prevent delamination between the PV layer 230 and the substrate 250. In some embodiments, the thickness of the lower encapsulant layer 240 is consistent across the entirety of the layered structure 200. In some embodiments, the lower encapsulant layer 240 comprises an encapsulating material such as ethylene-co-vinyl acetate ("EVA"), polydimethyl siloxane ("PDMS"), a polyolefin elastomer ("POE"), polyvinyl butyral ("PVB"), polyurethane epoxy, silicone, or an ionomer such as the series of ionomer-based encapsulants commercialized by DuPont de Nemours, Inc. under the trade name PV5400. In some embodiments, the lower encapsulant layer 240 comprises the same encapsulating material as the upper encapsulant layer 220.

Continuing to refer to FIG. 2A, in some embodiments, the layered structure 200 includes a substrate 250 having an upper surface 252 and a lower surface 254 opposite the lower surface 252. In some embodiments, the upper surface 252 of the substrate 250 contacts the lower surface 244 of the lower encapsulant layer 240. In some embodiments, the lower surface 254 of the substrate 250 forms the lower surface 204 of the layered structure 200. In some embodiments, the substrate 250 provides electrical insulation and moisture resistance. In some embodiments, the substrate 250 is optically transparent. In some embodiments, the substrate 250 is not optically transparent. In some embodiments, the substrate 250 comprises a glass material. In some embodiments, the substrate 250 comprises a polymeric material such as ETFE, PET, an acrylic such as PMMA, polypropylene, polyvinyl chloride ("PVC"), or a glass-reinforced or fiber-reinforced composite such as a material meeting the National Electrical Manufacturers Association ("NEMA") grades FR-4 or G-10. In some embodiments, the substrate 250 has a thickness in the range of 200 microns to ¼ inch. In some embodiments, the substrate 250 is sufficiently rigid to provide mechanical stiffening to the PV module 100.

Referring now to FIG. 2B, the layered structure 200 is shown following lamination. In some embodiments, during the lamination process, the encapsulating material of the upper encapsulant layer 220 and the encapsulating material of the lower encapsulant layer 240 are melted and flow within the gaps between adjacent ones of the PV elements 236 shown in FIG. 2A, thereby encapsulating (e.g., surrounding on all sides) each of the PV elements 236 with encapsulating material. In some embodiments, as a result of this process, the PV layer 230 includes encapsulant portions 238 located between adjacent ones of the PV elements 236, and providing continuity between the encapsulating material of the upper encapsulant layer 220 and the encapsulating material of the lower encapsulant layer 240. In some embodiments, the resulting region of the layered structure 200 (e.g., the upper encapsulant layer 220, the PV layer 230, and the lower encapsulant layer 240) resembles a single block of encapsulant material with the PV elements positioned therein.

Figure 3:
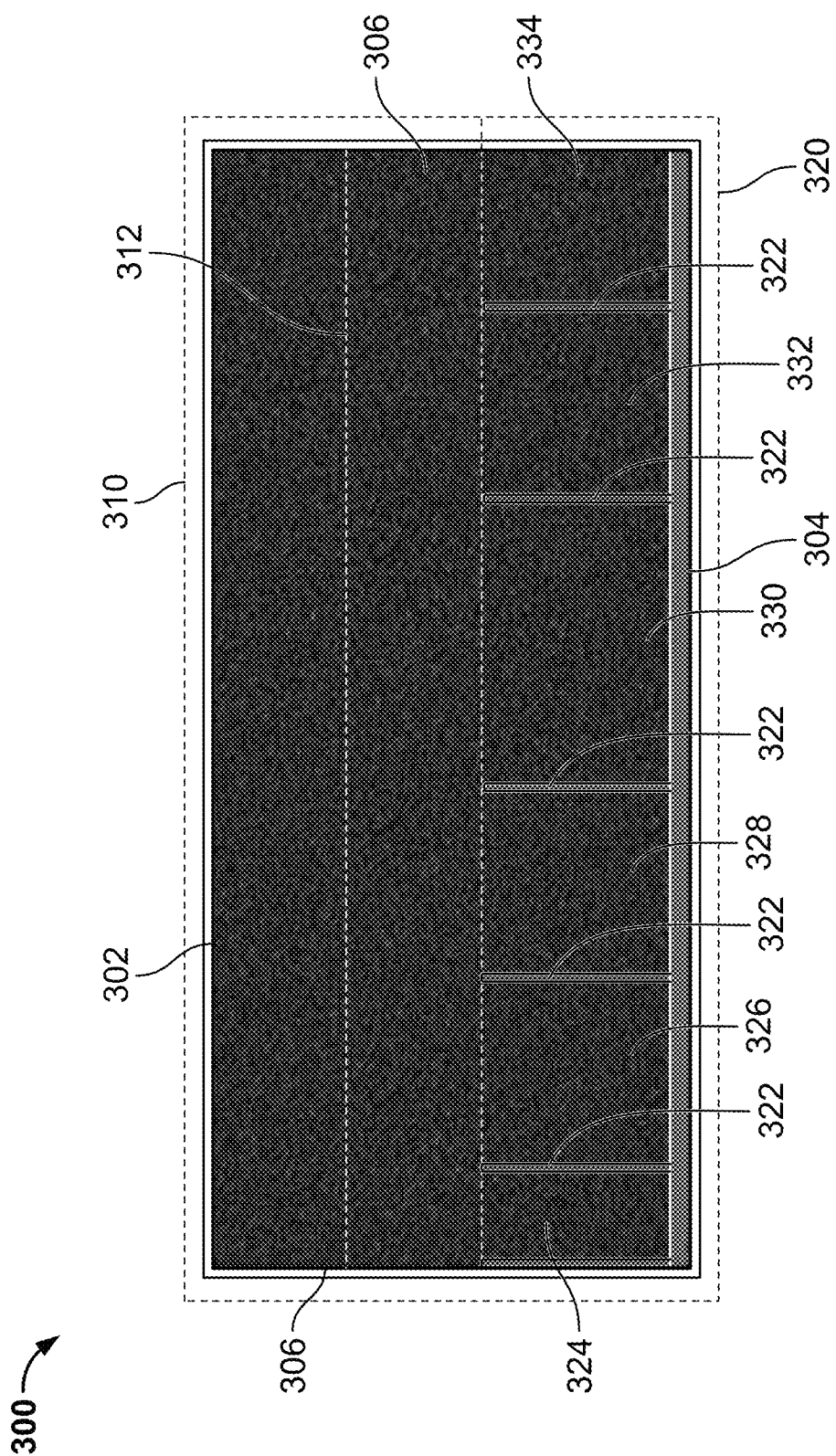
FIG. 3 shows an exemplary roofing shingle.
Figure 4A:
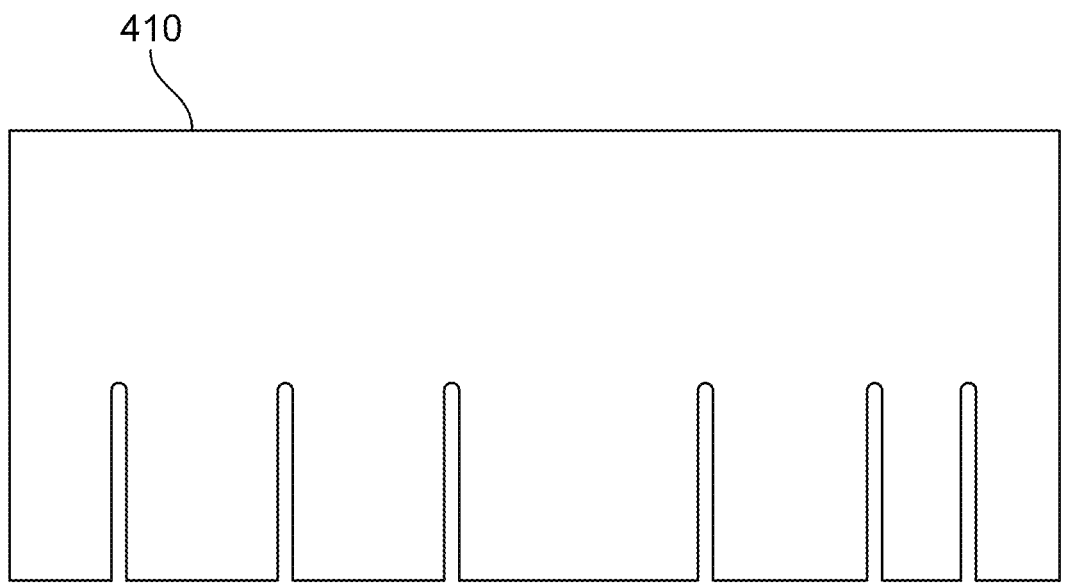
FIG. 4A shows a first variant of an exemplary roofing shingle.
Figure 4B:
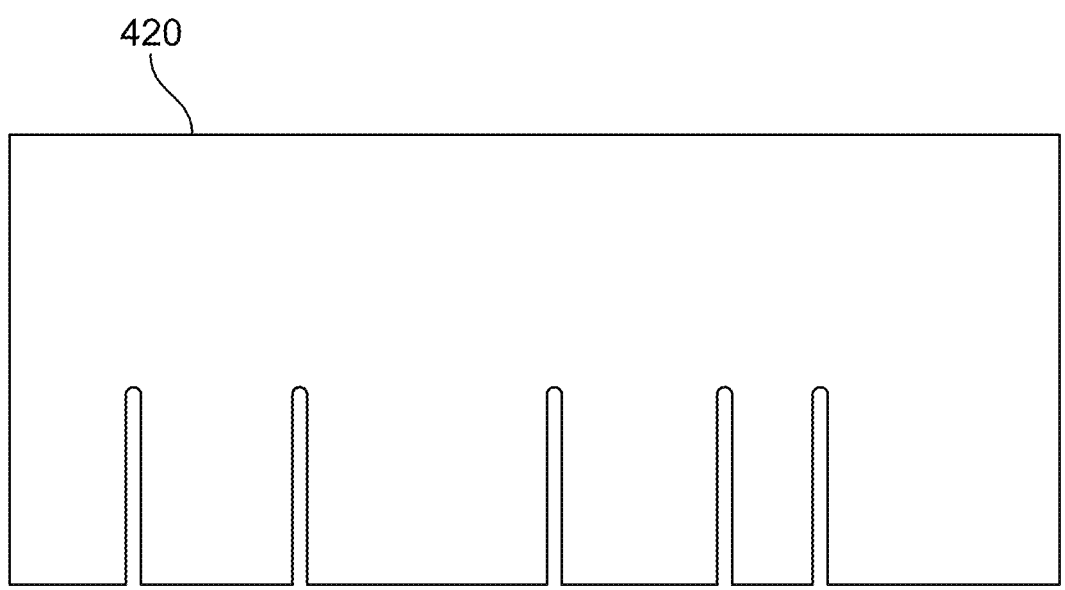
FIG. 4B shows a second variant of an exemplary roofing shingle.
Figure 4C:
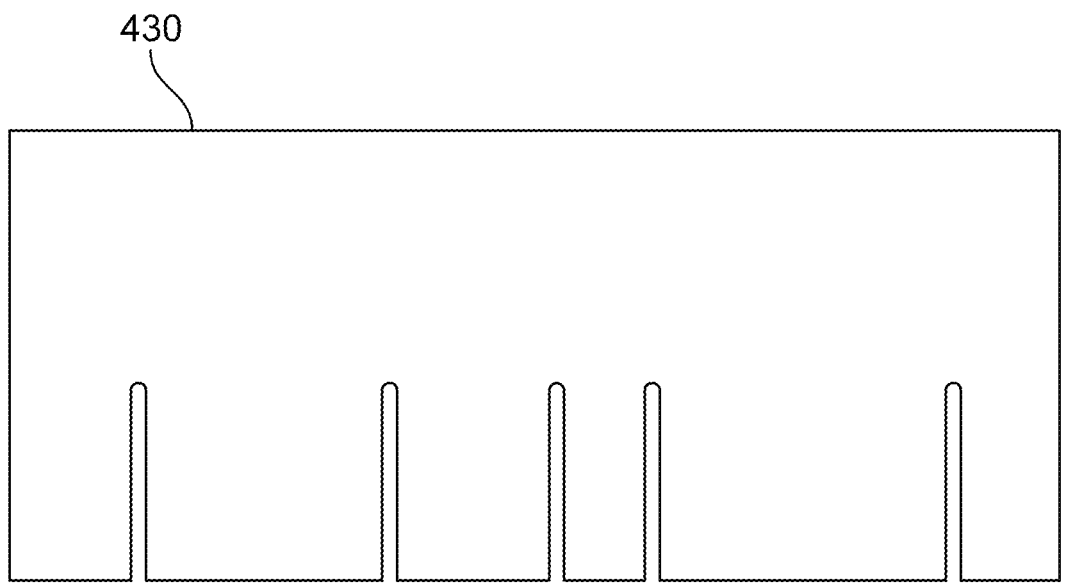
FIG. 4C shows a third variant of an exemplary roofing shingle.
Figure 4D:
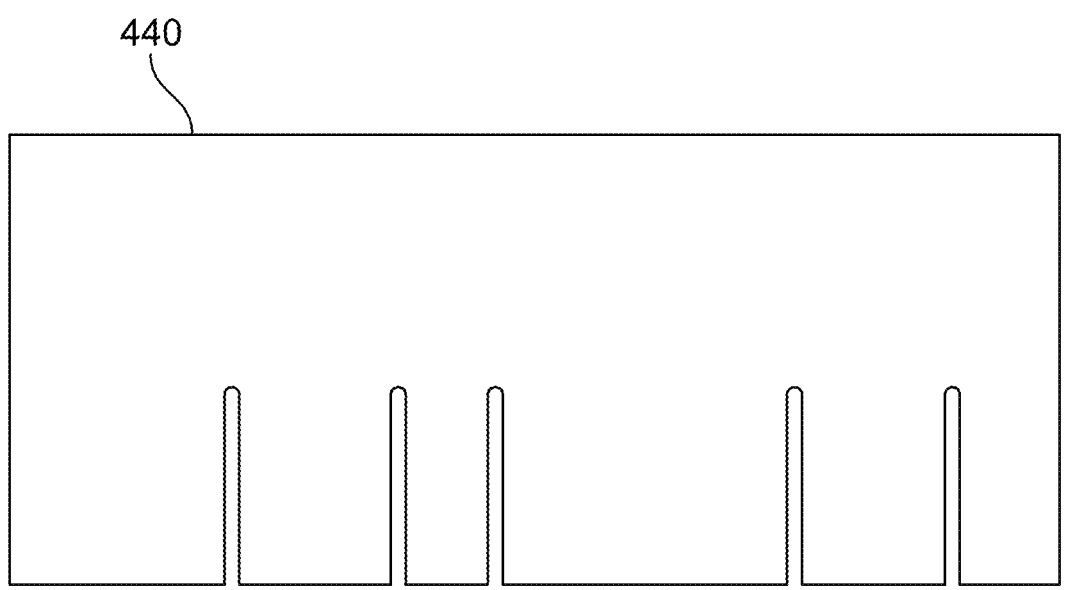
FIG. 4D shows a fourth variant of an exemplary roofing shingle.

FIG. 3 shows an exemplary roofing shingle 300. In some embodiments, the roofing shingle 300 comprises thermoplastic olefin ("TPO"), polyvinyl chloride ("PVC"), or asphalt. In some embodiments, roofing shingle 300 includes embedded granules. In some embodiments, the roofing shingle 300 includes a top end 302, a bottom end 304, a first side 306, and a second side. In some embodiments, the roofing shingle 300 includes a headlap region 310 adjacent the top end 302 and a tooth region 320 adjacent the bottom end 304. In some embodiments, the headlap region 310 defines a nailing line 312 extending across the headlap region 310. In some embodiments, the nailing line 312 extends across the headlap region 310 approximately midway between the end of the headlap region 310 that borders the tooth region 320 and the opposite end of the headlap region 110. In some embodiments, the nailing line 312 defines an area of the headlap region 310 through which mechanical fasteners (e.g., nails, screws, etc.) can be driven to secure the roofing shingle 300 to a roof deck in the standard manner.

In some embodiments, the tooth region 320 includes a plurality of slots 322 that are spaced apart along the width of the tooth region 320 from the first side 306 to the second side, and extend from the bottom end 304 toward the top end 302. In some embodiments, each of the slots 322 has a width that is the same as, or is similar to, the gaps between adjacent ones of the PV elements 236 in the PV module 100. In some embodiments, the width of each of the slots 322 is ½ inch. In some embodiments, the width of each of the slots 322 is 6 millimeters. In some embodiments, the first side 306, the slots 322, and the second side define a plurality of tooth portions 324, 326, 328, 330, 332, 334 therebetween. The exemplary roofing shingle 300 shown in FIG. 3 includes six (6) of the tooth portions 324, 326, 328, 330, 332, 334, but it will be apparent to those of skill in the art that various embodiments of the roofing shingle 300 may have any other number of tooth portions. In some embodiments, the width of the tooth portions 324, 326, 328, 330, 332, 334 is variable, e.g., for a given instance of the roofing shingle 300, a first one of the tooth portions (e.g., tooth portion 324) has a first width, and a second one of the tooth portions (e.g., tooth portion 326) has a second width that is different than the first width. In some embodiments, each of the tooth portions 324, 326, 328, 330, 332, 334 has a width that is an integer multiple of the PV cell width 237 (e.g., is equal to the PV cell width 237, or is two times, or three times, or four times, or five times, or six times, or seven times, or eight times, or nine times, or ten times, or eleven times, or twelve times, or thirteen times, or fourteen times, or fifteen times, or sixteen times, or seventeen times, or eighteen times, or nineteen times, or twenty times the PV cell width 237).

In some embodiments, different ones of the exemplary roofing shingle 300 have differently sized and differently arranged tooth portions. For example, in some embodiments, a manufacturer of the roofing shingle 300 may manufacture different versions of the roofing shingle 300 so as to provide a roofing system including a plurality of the roofing shingle 300 that differ from one another so as to provide a non-uniform appearance to the roofing system. FIGS. 4A-4D show different variants 410, 420, 430, and 440 of the exemplary roofing shingle 300. In some embodiments, each of the variants 410, 420, 430, and 440 has a plurality of tooth portions that vary in width among the different tooth portions of any given one of the variants 410, 420, 430, and 440, and the widths of all tooth portions are integer multiples of the PV cell width 237. In some embodiments, each of the variants 410, 420, 430, and 440 has tooth portions that differ in arrangement as compared to those of the others of the variants 410, 420, 430, and 440. In some embodiments, a manufacturer of the roofing shingle 300 may manufacture a suitable number of different variants so as to impart a random appearance to a roofing system incorporating such variants. For example, in some embodiments, a roofing system includes four of the variants 410, 420, 430, and 440, as shown in FIGS. 4A-4D, but it will be apparent to those of skill in the art that this is only exemplary, and that any other number of variants may be produced.

In some embodiments, the roofing shingle 300 is composed of a single layer. In some embodiments, the roofing shingle 300 is composed of multiple layers. In some embodiments, the roofing shingle 300 is laminated.

As discussed above, in some embodiments, the assembled PV module 100 includes a plurality of PV elements 236 that are spaced apart by a quantity of encapsulant portions 238 that are positioned between the PV elements 236 as part of the lamination process. In some embodiments, the space between the PV elements 236 that is formed in this manner is referred to as a "cell gap". In some embodiments, due to uniform sizing and spacing of the PV elements 236, the PV elements 236 and the cell gaps therebetween provide a uniform, grid-like appearance. In some embodiments, to provide a non-uniform appearance, the cell gap is selectively revealed or hidden.

Figure 5:
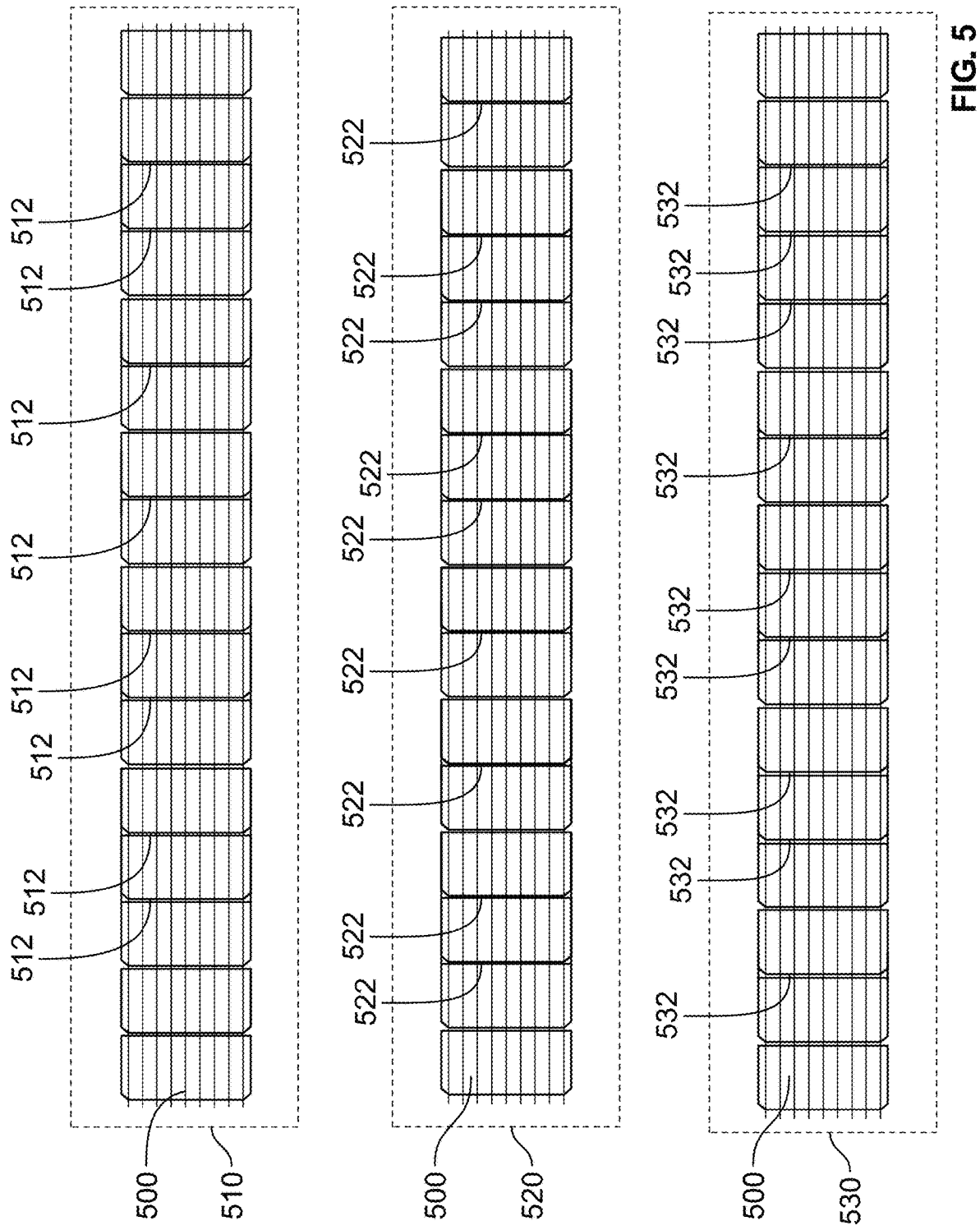
FIG. 5 shows exemplary embodiments of a PV module.

FIG. 5 shows PV elements 500 forming PV modules 510, 520, 530. For clarity, the PV elements 500 are substantially the only elements of the PV modules 510, 520, 530 shown in FIG. 5, but it will be apparent to those of skill in the art that the PV modules 510, 520, 530 will include other elements as described above. Also for clarity, only one of the PV elements 500 forming each of the PV modules 510, 520, 530 is specifically called out in FIG. 5, but it will be apparent to those of skill in the art that discussion of the PV elements 500 may refer to any of the PV elements 500 forming the PV modules 510, 520, 530, whether or not specifically identified in FIG. 5.

In some embodiments, as shown in FIG. 5, each of the PV modules 510, 520, 530 includes sixteen (16) of the PV elements 500 that are "half-cut" cells having a width of about 90 mm and a cell gap of about 4 mm between adjacent ones of the PV elements, thereby to produce the PV modules 510, 520, 530 that are 60 inches wide, but it will be apparent to those of skill in the art that these dimensions are only exemplary. In some embodiments, the PV modules 510, 520, 530 include portions 512, 522, 532, respectively, of a color-contrasting material positioned behind the PV elements 500 (e.g., positioned in or on the PV modules 510, 520, 530 so as to be positioned between the PV elements and a roof deck to which the PV modules 510, 520, 530 are installed). In some embodiments, the color-contrasting material comprises a patterned backsheet. In some embodiments, the color-contrasting material comprises a cloaking tape. As shown in FIG. 5, the inclusion of the portions 512, 522, 532 at different locations within the PV modules 510, 520, 530 provides a non-uniform appearance to the PV modules 510, 520, 530, despite each of the PV modules 510, 520, 530 having the same arrangement of the PV elements. Though FIG. 5 shows three of the PV modules 510, 520, 530 having different arrangements of the portions 512, 522, 532, it will be apparent to those of skill in the art that any number of different arrangements are possible without departing from the general concept embodied by the PV modules 510, 520, 530. Throughout this disclosure, the PV module 510 is indicated when it is desired to reference a PV module having color-contrasting material applied to the boundaries between some of the PV elements 500 so as to provide a non-uniform appearance as described above, but such reference to the PV module 510 is intended to refer to any of the PV modules 510, 520, 530, or any other PV module having such features.

Figure 6A:
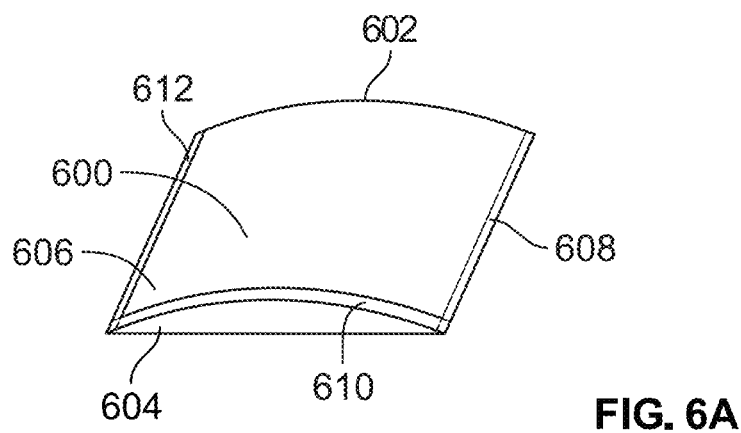
FIG. 6A shows an exemplary embodiment of a wireway.
Figure 6B:
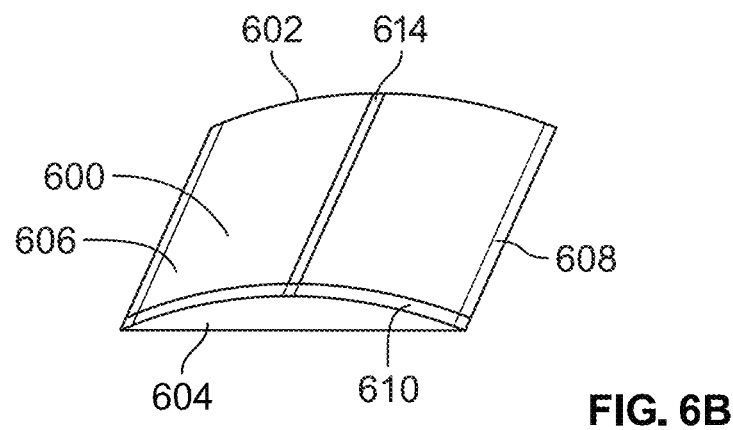
FIG. 6B shows an exemplary embodiment of a wireway.
Figure 6C:
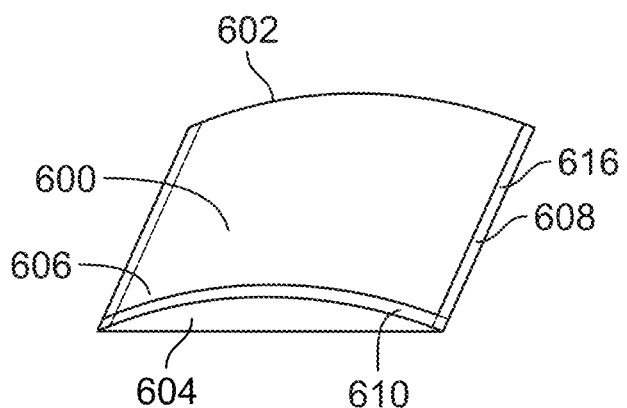
FIG. 6C shows an exemplary embodiment of a wireway.

In some embodiments, an exemplary solar roofing system includes wireways that are positioned between PV modules and are configured to enclose electrical cables that connect to the PV modules. In some embodiments, to facilitate providing an aesthetic appearance that is consistent both for the PV modules and the roofing shingles that form a solar roofing system, an exemplary solar roofing system includes wireways having a width that is matched to a width of the PV elements within the PV modules. FIGS. 6A, 6B, and 6C show embodiments of an exemplary wireway 600 having an upper end 602, a lower end 604, a first side 606, and a second side 608. In some embodiments, the exemplary wireway 600 is configured to be installed on a roof deck such that the lower end 604 is at a lower elevation than is the upper end 602. In some embodiments, the exemplary wireway 600 has a width as measured in a horizontal direction from the first side 606 to the second side 608 that is equal to an integer multiple of the PV cell width 237 for PV elements 236 that are used in the same solar roofing system as the exemplary wireway 600. In some embodiments, the width of the wireway 600 is two times the PV cell width 237. In some embodiments, the wireway 600 is rounded (e.g., so as to be concave on the side that faces the roof deck) to provide space to accommodate electrical cables and to soften the appearance of the wireway 600. In some embodiments, the top surface of the wireway 600 (e.g., the side that faces away from the roof deck) includes at least one dark-colored portion and at least one light-colored portion.

In some embodiments, the at least one light-colored portion includes a horizontal light-colored portion 610 extending across the wireway 600 from the first side 606 to the second side 608 adjacent the lower end 604. In some embodiments, a height of the horizontal light-colored portion 610 (e.g., as measured in a vertical direction from the lower end 604 toward the upper end 602) is equal to a creepage distance. As used herein, the creepage distance is the shortest distance along the surface of the insulating material between two conductive live parts or between conductive live parts and accessible part. For example, in embodiments detailed herein, the creepage distance is the shortest distance along the surface of an insulative portion of the PV module 510 between two conductive or accessible portions of the PV module 510. In some embodiments, the creepage distance results in the appearance of a light-colored region along the long edges of the PV module 510. Consequently, in some embodiments, the sizing of the horizontal light-colored portion 610 as equal to the creepage distance provides continuity of visual appearance between the wireway 600 and PV modules 510 that are adjacent thereto. In some embodiments, the height of the horizontal light-colored portion 610 is in a range of from 10 millimeters to 30 millimeters. In some embodiments, the height of the horizontal light-colored portion 610 is in a range of from 12.5 millimeters to 27.5 millimeters. In some embodiments, the height of the horizontal light-colored portion 610 is in a range of from 15 millimeters to 25 millimeters. In some embodiments, the height of the horizontal light-colored portion 610 is in a range of from 17.5 millimeters to 22.5 millimeters. In some embodiments, the height of the horizontal light-colored portion 610 is about 20 millimeters. In some embodiments, the height of the horizontal light-colored portion 610 is 20 millimeters.

In some embodiments, the at least one light-colored portion includes a vertical light-colored portion extending along the wireway 600 from the upper end 602 toward the lower end 604. In some embodiments, as shown in FIG. 6A, the vertical light-colored portion 612 extends along the wireway 600 and along the first side 606. In some embodiments, as shown in FIG. 6B, the vertical light-colored portion 614 extends along the wireway 600 and intermediate the first and second sides 606, 608. In some embodiments, as shown in FIG. 6C, the vertical light-colored portion 616 extends along the wireway 600 and along the second side 608. In some embodiments, the width of the vertical light-colored portion 612, 614, 616 is about equal to (e.g., within plus or minus 25%) the width of a cell gap, as described above with reference to FIG. 5. In some embodiments, the width of the vertical light-colored portion 612, 614, 616 is equal to the width of a cell gap. In some embodiments, the width of the vertical light-colored portion 612, 614, 616 is 6 mm. In some embodiments, the width of the vertical light-colored portion 612, 614, 616 is about 6 mm. In some embodiments, the width of the vertical light-colored portion 612, 614, 616 is from 5 mm to 7 mm. In some embodiments, the width of the vertical light-colored portion 612, 614, 616 is from 4 mm to 8 mm. In some embodiments, the width of the vertical light-colored portion 612, 614, 616 is from 3 mm to 9 mm. In some embodiments, the width of the vertical light-colored portion 612, 614, 616 is from 3% of a width of the wireway 600 to 10% of the width of the wireway 600. In some embodiments, the vertical light-colored portion 612 or 616 either provides a dark-colored region having a width that is twice the PV cell width 237. In some embodiments, the vertical light-colored portion 614 provides two dark-colored regions, each of which has a width that is equal to the PV cell width 237. Accordingly, in some embodiments, vertical light-colored portions 612, 614, 616 cause the wireway to have an appearance that is consistent with those of the roofing shingle 300 and the PV module 510, thereby improving the consistency, visual flow, and aesthetic appearance of a roofing system including the wireway 600.

Figure 6D:
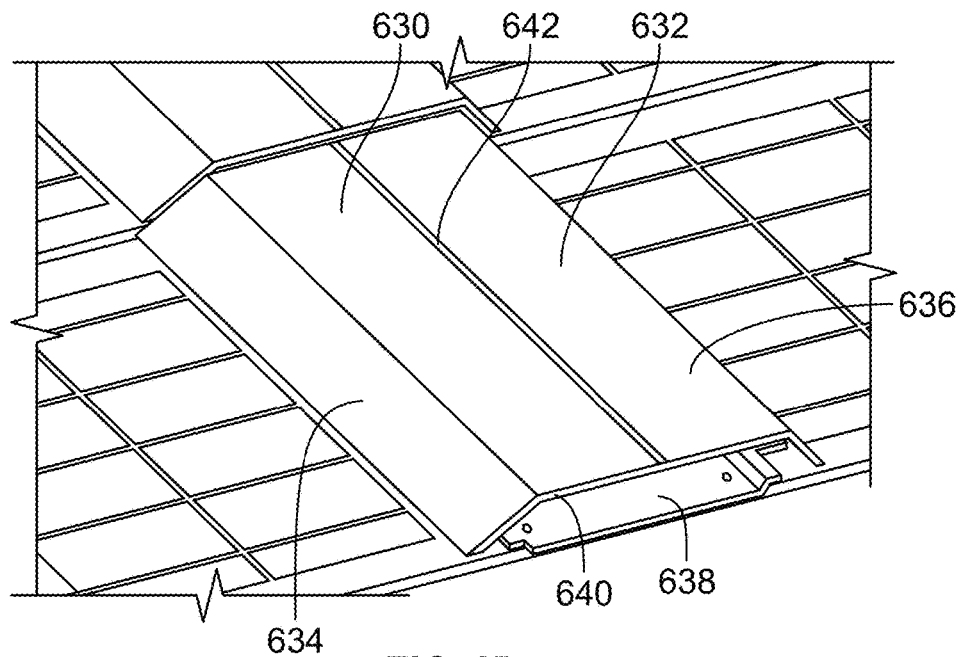
FIGS. 6D through 6F show another exemplary embodiment of a wireway.

In some embodiments, an exemplary wireway 630, as shown in FIG. 6D positioned between adjacent PV modules, is substantially similar to the wireway 600 described above with reference to FIGS. 6A-6C, other than as described hereinafter. In some embodiments, the wireway 630 has a flat top surface 632 and angled sides 634, 636. In some embodiments, the flat top surface 632 and angled sides 634, 636 of the wireway 630 define a channel 638 within the wireway 630 to provide space to accommodate electrical cables. In some embodiments, the top surface of the wireway 630 (e.g., the side that faces away from the roof deck) includes at least one dark-colored portion and at least one light-colored portion. In some embodiments, the wireway 630 includes a horizontal light-colored portion 640 that is substantially similar to the horizontal light-colored portion 610 of the wireway 600 described above. In some embodiments, the wireway 630 includes a vertical light-colored portion 642. The vertical light-colored portion 642 shown in FIG. 6D extends across the top surface 632 of the wireway 630 intermediate the sides 634, 636, in a manner similar to the vertical light-colored portion 614 shown in FIG. 6B, but it will be apparent to those of skill in the art that, in other embodiments, the vertical light-colored portion 642 of the wireway 630 may extend along either of the sides 634 or 636, in a manner similar to the vertical light-colored portions 612 and 616 shown in FIGS. 6A and 6C, respectively.

Figure 6E:
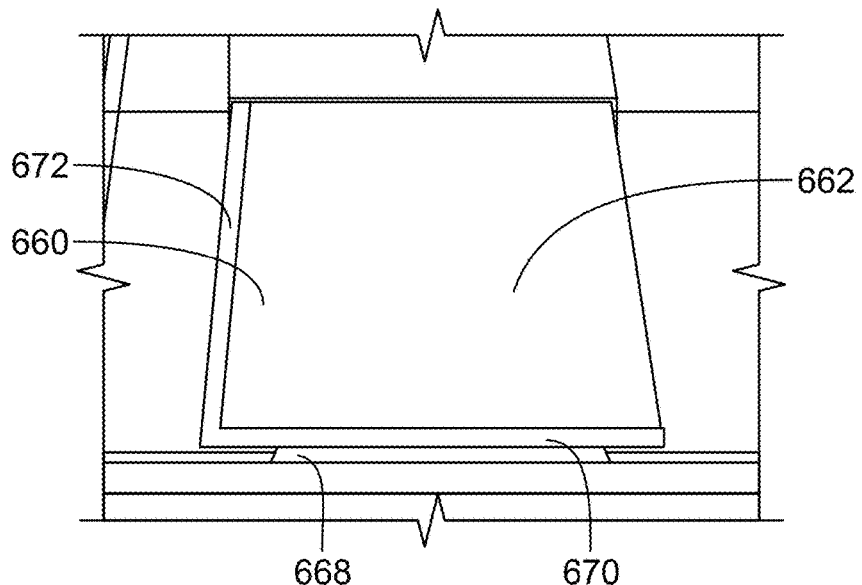
Figure 6F:
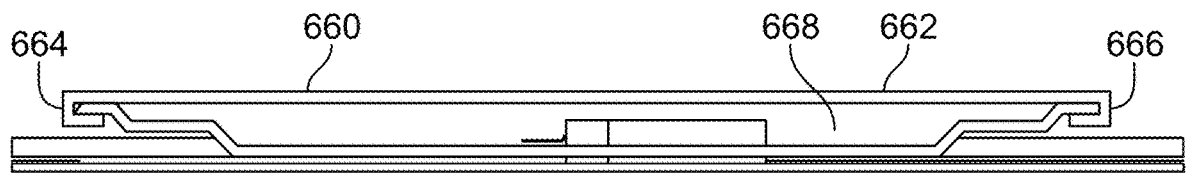

In some embodiments, an exemplary wireway 660, as shown in perspective in FIG. 6E and in a front view in FIG. 6F, is substantially similar to the wireway 600 described above with reference to FIGS. 6A-6C, other than as described hereinafter. In some embodiments, the wireway 660 has a flat top 662 and sides 664, 666 that are substantially perpendicular to the flat top 662. In some embodiments, the flat top 662 and angled sides 664, 666 of the wireway 660 define a channel 668 within the wireway 660 to provide space to accommodate electrical cables. In some embodiments, the top surface of the wireway 660 (e.g., the side that faces away from the roof deck) includes at least one dark-colored portion and at least one light-colored portion. In some embodiments, the wireway 660 includes a horizontal light-colored portion 670 that is substantially similar to the horizontal light-colored portion 610 of the wireway 600 described above. In some embodiments, the wireway 660 includes a vertical light-colored portion 672. The vertical light-colored portion 672 shown in FIG. 6E extends across the top surface 632 of the wireway 630 along the side, in a manner similar to the vertical light-colored portion 612 shown in FIG. 6A, but it will be apparent to those of skill in the art that, in other embodiments, the vertical light-colored portion 672 of the wireway 660 may extend along the side 636, in a manner similar to the vertical light-colored portion 616 shown in FIG. 6C, or may extend across the top surface 632 intermediate the sides 634, 636, in a manner similar to the vertical light-colored portion 614 shown in FIG. 6B.

Figure 7:
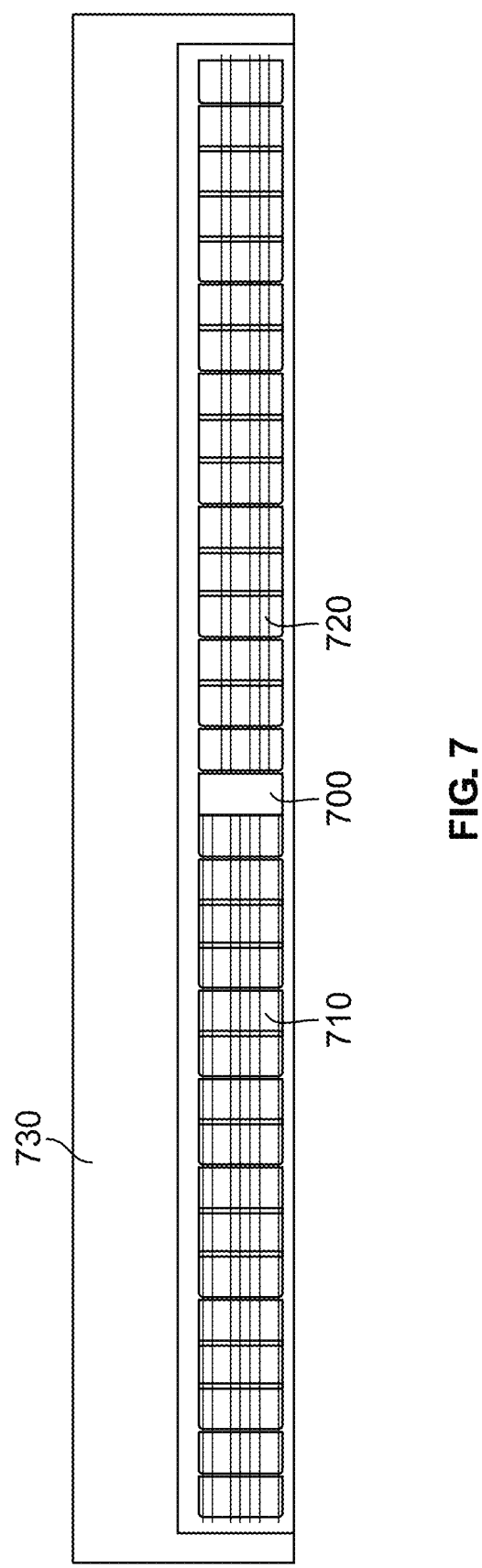
FIG. 7 shows an exemplary embodiment of a masking element.

In some embodiments, an exemplary roofing system includes a masking element applied to the border between adjacent PV modules. FIG. 7 shows an exemplary masking element 700 applied to the border between adjacent PV modules 710, 720 (e.g., the PV modules 510, 520, 530 as described above with reference to FIG. 5). In some embodiments, the masking element 700 is a dark color. In some embodiments, the masking element 700 is black. In some embodiments, the masking element 700 is made from a polymeric material. In some embodiments, the masking element 700 is made from a polymeric foam. In some embodiments, the masking element 700 is made from expanded polyethylene ("EPE"). In some embodiments, the masking element 700 is used in connection with the PV modules 710, 720 that have a high-contrast backsheet 730. In some embodiments, due to the high contrast of the backsheet 730, any color difference between the masking element 700 and the PV modules 710, 720 is swamped out, thereby hiding the boundary between the masking element 700 and the PV modules 710, 720. In some embodiments, by hiding the boundary between adjacent PV modules, use of the masking element 700 reduces the uniform, grid-like appearance of a roofing system including the PV modules 710, 720.

Figure 8A:
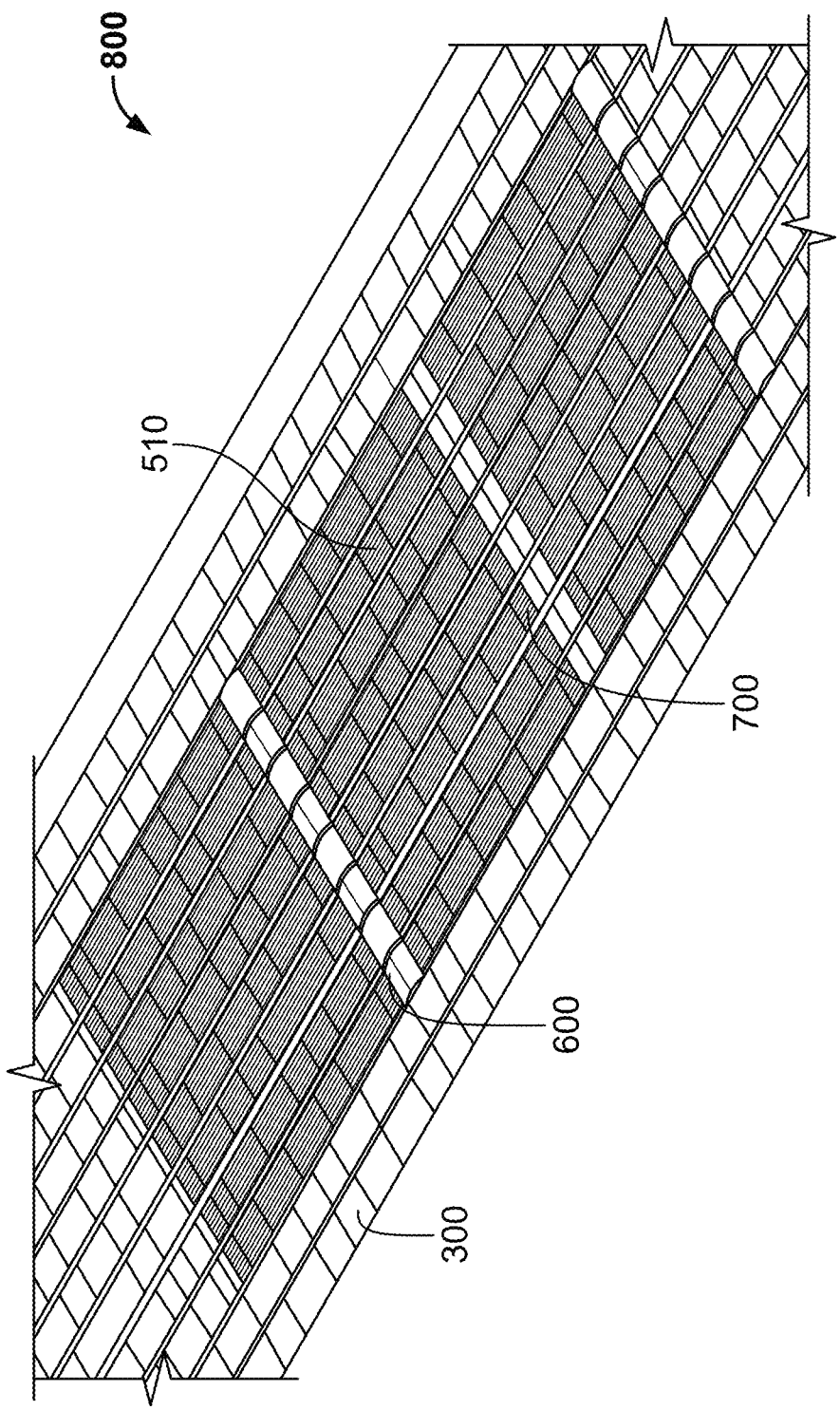
FIG. 8A shows an exemplary embodiment of a roofing system.
Figure 8B:
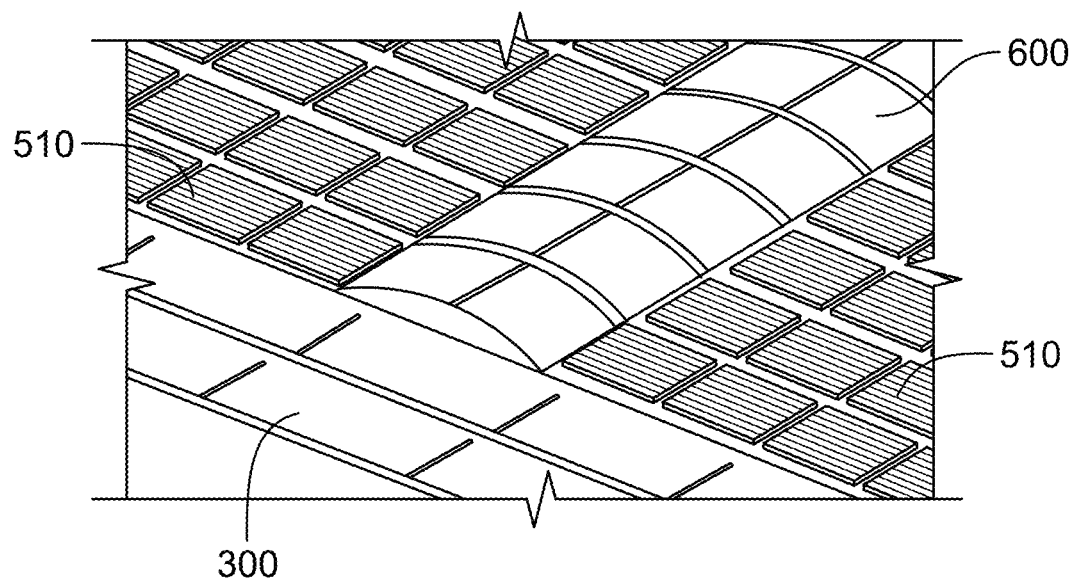
FIG. 8B shows a magnified view of a first portion of the roofing system of FIG. 8A.
Figure 8C:
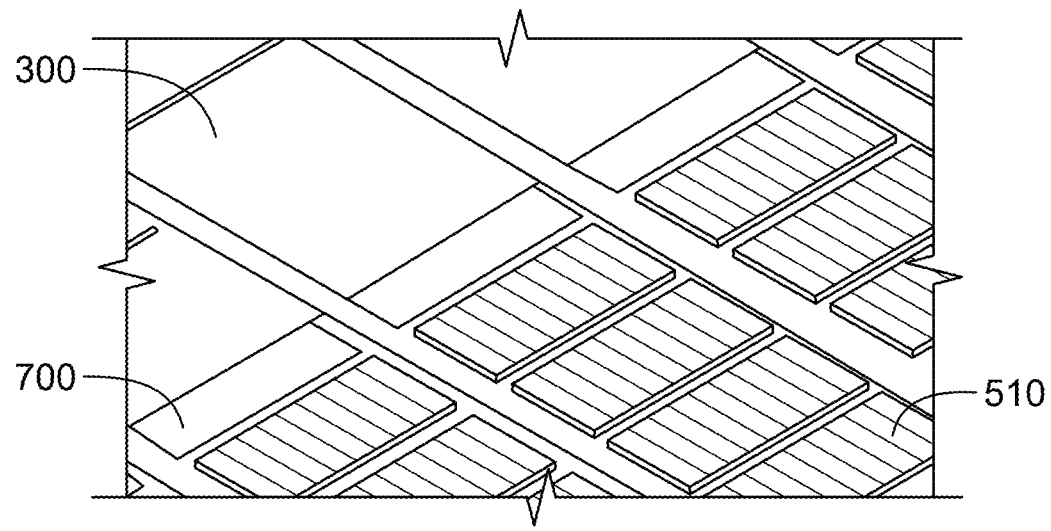
FIG. 8C shows a magnified view of a second portion of the roofing system of FIG. 8A.
Figure 8D:
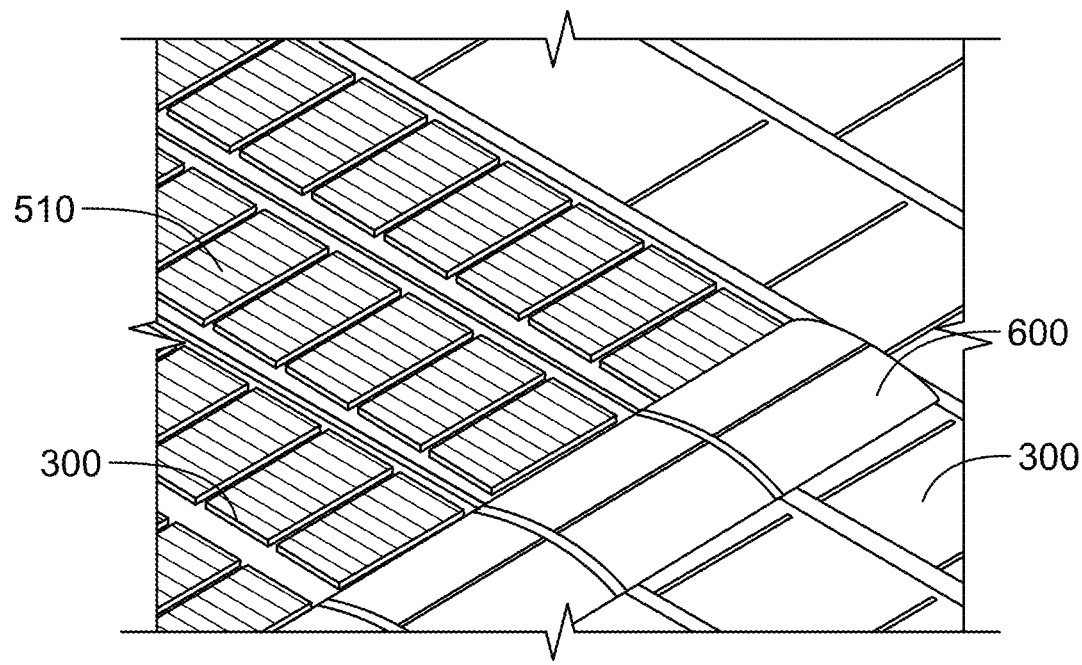
FIG. 8D shows a magnified view of a third portion of the roofing system of FIG. 8A.
Figure 8E:
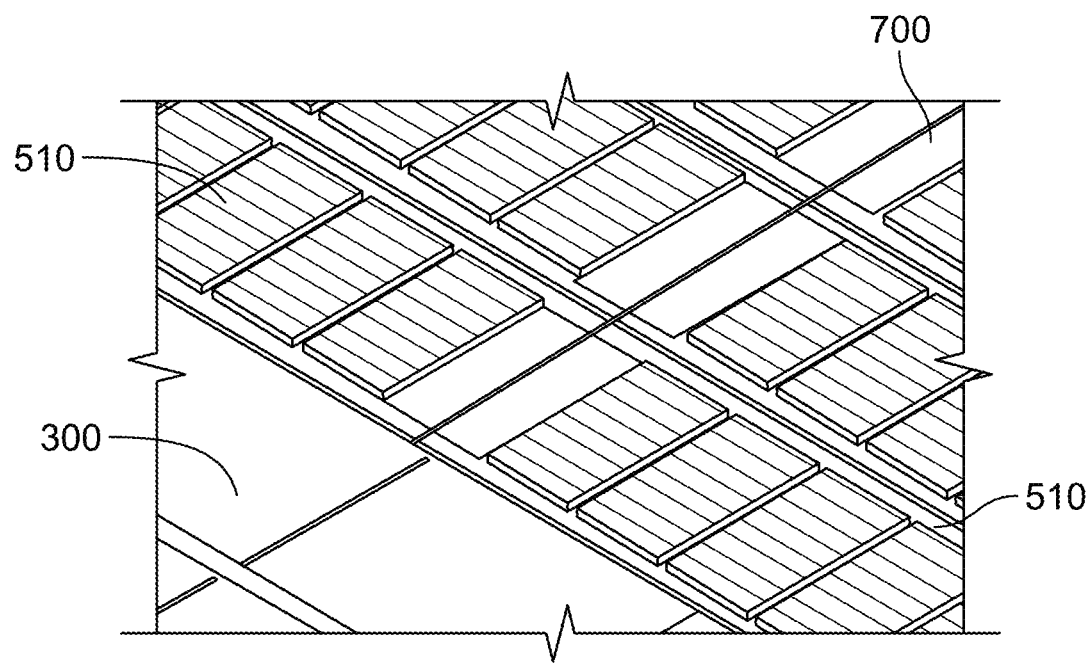
FIG. 8E shows a magnified view of a fourth portion of the roofing system of FIG. 8A.

In some embodiments, a solar roofing system including one or more of the roofing shingle 300, the PV module 510, the wireway 600, and/or the masking element 700 provides an appearance that includes similar degrees and types of irregular/randomized appearance across all elements of the roofing system. In some embodiments, such a randomized appearance is harmonized around the cell pitch, i.e., the sum of the width of each PV cell and the cell gap. In some embodiments, such a similarly-randomized appearance causes the various elements of the solar roofing system to visually blend with one another, thereby providing a more aesthetically pleasing appearance to the overall solar roofing system FIG. 8A shows an exemplary roofing system 800 that includes a plurality of the roofing shingle 300, a plurality of the PV module 510, a plurality of the wireway 600, and a plurality of the masking element 700. For clarity, only one of each of the elements noted above is specifically identified by a reference numeral in FIG. 8A. FIG. 8B shows a magnified view of a portion of the roofing system 800 including a plurality of the roofing shingle 300, a plurality of the PV module 510, and a plurality of the wireway 600 separating adjacent ones of the PV module 510. FIG. 8C shows a magnified view of a portion of the roofing system 800 including a plurality of the roofing shingle 300, a plurality of the PV module 510, and a plurality of the masking element 700 ones of the PV module 510 from adjacent ones of the roofing shingle 300. FIG. 8D shows a magnified view of a portion of the roofing system 800 including a plurality of the roofing shingle 300, a plurality of the PV module 510, and a plurality of the wireway 600 separating ones of the PV module 510 from adjacent ones of the roofing shingle 300. FIG. 8E shows a magnified view of a portion of the roofing system 800 including a plurality of the roofing shingle 300, a plurality of the PV module 510, and a plurality of the masking element 700 separating adjacent ones of the PV module 510. It may be seen from FIGS. 8A-8E that the roofing system 800 including a plurality of the roofing shingle 300, a plurality of the PV module 510, a plurality of the wireway 600, and a plurality of the masking element 700 provides an aesthetic appearance in which the various elements of the roofing system 800 blend with one another aesthetically, rather than one in which the PV module 510 stands out. It will be apparent to those of skill in the art that the roofing system 800 shown in FIGS. 8A-8E is only one exemplary manner of arranging a plurality of the roofing shingle 300, a plurality of the PV module 510, a plurality of the wireway 600, and a plurality of the masking element 700, and that any number of other arrangements of these same elements may be made. It will be further apparent to those of skill in the art that while the roofing system 800 shown in FIGS. 8A-8E includes all of the roofing shingle 300, the PV module 510, the wireway 600, and the masking element 700, the same or similar aesthetic effect may be accomplished with a subset of these elements (including, but not limited to, with the roofing shingle 300 and the PV module 510; with the roofing shingle 300, the PV module 510, and the wireway 600; or with the roofing shingle 300, the PV module 510, and the masking element 700).

In some embodiments, the various elements of the exemplary roofing system 800 mimic the water-shedding ability of a conventional roof shingle. In some embodiments, the various elements of the exemplary roofing system can be affixed to a roof deck using typical roofing methods such as nails or screws.

In some embodiments, the roofing system 800 also includes at least one starter bar, a foot module, and a plurality of water shedding layers. In some embodiments, the roofing shingle 300 and/or the PV module includes an upper portion and a lower portion and is configured to be installed such that the upper portion is at a higher elevation than the lower portion. In some embodiments, the at least one starter bar is configured to be installed to a roof deck and includes a foot base. In some embodiments, a first one of the water shedding layers is configured to be installed over the foot base of the at least one starter bar, and at least one other one of the water shedding layers is configured to overlap and be installed over the first one of the plurality of water shedding layers. In some embodiments, the foot module is configured to be attached to the upper portion of the PV module 510 and/or the roofing shingle 300. In some embodiments, the lower portion of the PV module 510 and/or the roofing shingle 300 is adapted to align with the foot base of the at least one starter bar, and the foot module is configured to be affixed to a last overlapping layer of the at least one of another of the first plurality of water shedding layers to the roof deck.

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated).

What is claimed is:

1. A roofing system, comprising:
a plurality of photovoltaic modules on a roof deck,
wherein each of the plurality of photovoltaic modules includes a plurality of photovoltaic cells,
wherein each of the plurality of photovoltaic cells has one constant photovoltaic cell width; and
a plurality of roofing shingles proximate to the plurality of photovoltaic modules on the roof deck,
wherein each of at least some of the plurality of roofing shingles having
a top surface,
an exposure zone at a lower end of the top surface and
a headlap zone at an upper end of the top surface, and
a plurality of tooth portions extending from the lower end toward the headlap zone,
wherein a first one of the plurality of tooth portions has a first width,
wherein the first width is the photovoltaic cell width,
wherein a second one of the plurality of tooth portions has a second width,
wherein the second width is the photovoltaic cell width multiplied by a first positive integer that is greater than 1,
wherein a third one of the plurality of tooth portions has a third width,
wherein the third width is the photovoltaic cell width multiplied by a second positive integer that is greater than 1 and different than the first positive integer,
wherein each of the roofing shingles does not include a photovoltaic cell.

2. The roofing system of claim 1, wherein the plurality of roofing shingles comprises at least a first roofing shingle, wherein the first roofing shingle comprises thermoplastic olefin, polyvinyl chloride, or asphalt.

3. The roofing system of claim 2, wherein a top surface of the first roofing shingle comprises embedded granules.

4. The roofing system of claim 1, wherein the plurality of roofing shingle comprises at least a first roofing shingle and a second roofing shingle, wherein an arrangement of tooth portions of the second roofing shingle is not identical to an arrangement of tooth portions of the first roofing shingle.

5. The roofing system of claim 1, wherein the plurality of roofing shingle comprises at least a first roofing shingle and a second roofing shingle, wherein an arrangement of tooth portions of the second roofing shingle is identical to an arrangement of tooth portions of the first roofing shingle.

6. The roofing system of claim 1, wherein each of the first and second positive integers is selected from the group consisting of 2, 3, 4, 5, 6, 7, 8, 9, 10, 11, 12, 13, 14, 15, 16, 17, 18, 19, and 20.

7. The roofing system of claim 1, wherein the plurality of tooth portions of at least some of the plurality of roofing shingles comprises a fourth one of the plurality of tooth portions having a fourth width, wherein the fourth width is the photovoltaic cell width multiplied by 0.5.

8. A roofing system, comprising:
a plurality of photovoltaic modules on a roof deck,
wherein each of the plurality of photovoltaic modules includes a plurality of photovoltaic cells,
wherein each of the plurality of photovoltaic cells has one constant photovoltaic cell width; and
a plurality of roofing shingles proximate to the plurality of photovoltaic modules on the roof deck,
wherein each of at least some of the plurality of roofing shingles having
a top surface,
an exposure zone at a lower end of the top surface and
a headlap zone at an upper end of the top surface, and
a plurality of tooth portions extending from the lower end toward the headlap zone,
wherein a first one of the plurality of tooth portions has a first width,
wherein the first width is the photovoltaic cell width multiplied by a first positive integer that is greater than 1,
wherein a second one of the plurality of tooth portions has a second width,
wherein the second width is the photovoltaic cell width multiplied by a second positive integer that is greater than 1 and different than the first positive integer,
wherein each of the roofing shingles does not include a photovoltaic cell.

9. The roofing system of claim 8, wherein the plurality of roofing shingles comprises at least a first roofing shingle, wherein the first roofing shingle comprises thermoplastic olefin, polyvinyl chloride, or asphalt.

10. The roofing system of claim 9, wherein a top surface of the first roofing shingle comprises embedded granules.

11. The roofing system of claim 8, wherein the plurality of roofing shingle comprises at least a first roofing shingle and a second roofing shingle, wherein an arrangement of tooth portions of the second roofing shingle is not identical to an arrangement of tooth portions of the first roofing shingle.

12. The roofing system of claim 8, wherein the plurality of roofing shingle comprises at least a first roofing shingle and a second roofing shingle, wherein an arrangement of tooth portions of the second roofing shingle is identical to an arrangement of tooth portions of the first roofing shingle.

13. The roofing system of claim 8, wherein each of the first and second positive integers is selected from the group consisting of 2, 3, 4, 5, 6, 7, 8, 9, 10, 11, 12, 13, 14, 15, 16, 17, 18, 19, and 20.

14. The roofing system of claim 8, wherein the plurality of tooth portions of at least some of the plurality of roofing shingles comprises a third one of the plurality of tooth portions having a third width, wherein the third width is the photovoltaic cell width multiplied by 0.5.

15. A method, comprising:
obtaining a plurality of photovoltaic modules,
wherein each of the plurality of photovoltaic modules includes a plurality of photovoltaic cells,
wherein each of the plurality of photovoltaic cells has one constant photovoltaic cell width; and
obtaining a plurality of roofing shingles,
wherein each of at least some of the plurality of roofing shingles having
a top surface,
an exposure zone at a lower end of the top surface and
a headlap zone at an upper end of the top surface, and
a plurality of tooth portions from the lower end toward the headlap zone,
wherein a first one of the plurality of tooth portions has a first width,
wherein the first width is the photovoltaic cell width,
wherein a second one of the plurality of tooth portions has a second width,
wherein the second width is the photovoltaic cell width multiplied by a first positive integer that is greater than 1,
wherein a third one of the plurality of tooth portions has a third width,
wherein the third width is the photovoltaic cell width multiplied by a second positive integer that is greater than 1 and different than the first positive integer,
wherein each of the roofing shingles do not include a photovoltaic cell; and
installing the plurality of photovotaic modules and the plurality of roofing shingles proximate one another above a roof deck.

16. The method of claim 15, wherein the plurality of roofing shingles comprises at least a first roofing shingle, wherein the first roofing shingle comprises thermoplastic olefin, polyvinyl chloride, or asphalt.

17. The method of claim 15, wherein a top surface of the first roofing shingle comprises embedded granules.

18. The method of claim 15, wherein each of the first and second positive integers is selected from the group consisting of 2, 3, 4, 5, 6, 7, 8, 9, 10, 11, 12, 13, 14, 15, 16, 17, 18, 19, and 20.

19. The method of claim 15, wherein the plurality of tooth portions of at least some of the plurality of roofing shingles comprises a fourth one of the plurality of tooth portions having a fourth width, wherein the fourth width is the photovoltaic cell width multiplied by 0.5.

20. The method of claim 19, wherein each of the first and second positive integers is selected from the group consisting of 2, 3, 4, 5, 6, 7, 8, 9, 10, 11, 12, 13, 14, 15, 16, 17, 18, 19, and 20.

* * * * *